(12) United States Patent
Xiao et al.

(10) Patent No.: US 9,384,227 B1
(45) Date of Patent: Jul. 5, 2016

(54) DATABASE SYSTEM PROVIDING SKEW METRICS ACROSS A KEY SPACE

(71) Applicant: Amazon Technologies, Inc., Reno, NV (US)

(72) Inventors: Wei Xiao, Kirkland, WA (US); Yijun Lu, Kenmore, WA (US); Miguel Mascarenhas Filipe, Seattle, WA (US); Kiran-Kumar Muniswamy-Reddy, Seattle, WA (US); Bjorn Patrick Swift, Seattle, WA (US); David Craig Yanacek, Seattle, WA (US); Stuart Henry Seelye Marshall, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 146 days.

(21) Appl. No.: 13/909,418

(22) Filed: Jun. 4, 2013

(51) Int. Cl.
  *G06F 7/00* (2006.01)
  *G06F 17/30* (2006.01)

(52) U.S. Cl.
  CPC .................. *G06F 17/3033* (2013.01)

(58) Field of Classification Search
  CPC .............. G06F 3/0613; G06F 12/1018; G06F 17/30097; G06F 17/30109; G06F 2207/388
  USPC ........................... 707/698, 700, 688, 999.002
  See application file for complete search history.

(56) References Cited

U.S. PATENT DOCUMENTS

| | | | |
|---|---|---|---|
| 5,724,539 A * | 3/1998 | Riggle et al. ................... 711/100 |
| 6,205,477 B1 * | 3/2001 | Johnson et al. ............... 709/220 |
| 6,862,623 B1 * | 3/2005 | Odhner et al. ................ 709/226 |
| 6,938,256 B2 * | 8/2005 | Deng et al. ................... 718/104 |
| 7,058,704 B1 * | 6/2006 | Mangipudi et al. ........... 709/223 |
| 7,447,777 B1 * | 11/2008 | Singh Ahuja et al. ........ 709/227 |
| 7,907,522 B2 * | 3/2011 | Raghunath et al. ........... 370/229 |
| 8,024,306 B2 * | 9/2011 | Palliyil et al. ................. 707/698 |
| 8,527,473 B1 * | 9/2013 | Brown et al. ................. 707/682 |
| 2003/0084140 A1 * | 5/2003 | Takeuchi et al. .............. 709/223 |
| 2003/0097370 A1 * | 5/2003 | Yamamoto ................. 707/104.1 |
| 2004/0246905 A1 * | 12/2004 | Dunagan et al. .............. 370/252 |
| 2005/0097384 A1 * | 5/2005 | Uehara et al. ..................... 714/1 |
| 2005/0131914 A1 | 6/2005 | Abdo et al. |
| 2005/0155763 A1 * | 7/2005 | Reddy et al. .................. 166/295 |
| 2006/0005198 A1 * | 1/2006 | Uchishiba et al. ............. 718/104 |
| 2006/0075082 A1 * | 4/2006 | Haga et al. .................... 709/223 |
| 2007/0050504 A1 * | 3/2007 | Gomez et al. ................. 709/226 |
| 2008/0082983 A1 * | 4/2008 | Groetzner et al. ............ 718/105 |
| 2008/0306990 A1 | 12/2008 | Grosman et al. |

(Continued)

*Primary Examiner* — Mohammed R Uddin

(74) *Attorney, Agent, or Firm* — Robert C. Kowert; Meyertons, Hood, Kivlin, Kowert & Goetzel, P.C.

(57) ABSTRACT

A database service may maintain tables on behalf of clients and may provision throughput capacity for those tables. A table may be divided into multiple partitions, according to hash of the primary key values for each of the items in the table, and the items in the table may be accessed using the hash of their primary key values. Provisioned throughput capacity for the table may be divided between the partitions and used in servicing requests directed to items in the table. The service (or underlying system) may provide mechanisms for generating skew-related metrics or reports and presenting them to clients via a graphical user interface (GUI). The metrics and reports may indicate the amount of uniformity or skew in the distribution of requests across the key space for the table using histograms, heat maps, or other representations. Clients may initiate actions to correct any skewing via the GUI.

21 Claims, 18 Drawing Sheets

(56) References Cited

U.S. PATENT DOCUMENTS

| | | |
|---|---|---|
| 2009/0138467 A1 | 5/2009 | Hunar et al. |
| 2009/0138883 A1* | 5/2009 | McLean .................. 718/104 |
| 2009/0157870 A1* | 6/2009 | Nakadai .................. 709/224 |
| 2010/0114870 A1 | 5/2010 | Al-Omari et al. |
| 2010/0162251 A1 | 6/2010 | Richards et al. |
| 2011/0029498 A1* | 2/2011 | Ferguson et al. ............ 707/703 |
| 2011/0055151 A1* | 3/2011 | Duan et al. .................. 707/610 |
| 2011/0145244 A1 | 6/2011 | Kim et al. |
| 2011/0282832 A1* | 11/2011 | Rishel et al. ................ 707/609 |
| 2011/0295814 A1* | 12/2011 | Kothari et al. ............... 707/687 |
| 2012/0330954 A1* | 12/2012 | Sivasubramanian et al. . 707/737 |
| 2013/0081035 A1* | 3/2013 | Nardelli et al. .............. 718/102 |
| 2014/0064281 A1* | 3/2014 | Basso et al. .................. 370/392 |
| 2014/0108001 A1* | 4/2014 | Brown et al. .................. 703/23 |
| 2014/0344453 A1* | 11/2014 | Varney et al. ................ 709/224 |

* cited by examiner

DATABASE SYSTEM PROVIDING SKEW METRICS ACROSS A KEY SPACE

BACKGROUND

Several leading technology organizations are investing in building technologies that sell "software-as-a-service". Such services provide access to shared storage (e.g., database systems) and/or computing resources to clients, or subscribers. Within multi-tier e-commerce systems, different resources may be allocated to subscribers and/or their applications from whole machines, to CPU, to memory, to network bandwidth, and to I/O capacity.

A distributed database service typically partitions data and resources across multiple storage nodes. Interaction between client applications and database servers typically includes read operations (read-only queries), write operations (to store data), and update operations that can be conceptualized using a read-modify-write workflow.

Some database services provide guaranteed throughput for customers at a throughput level that they purchase. The guaranteed throughput is typically specified and provided on the basis of reads per second (RPS) and writes per second (WPS). However, the performance of such database services can vary widely even when a customer is not consuming their total guaranteed throughput if the distribution of reads and writes is not relatively uniform across their data.

Figure 1:
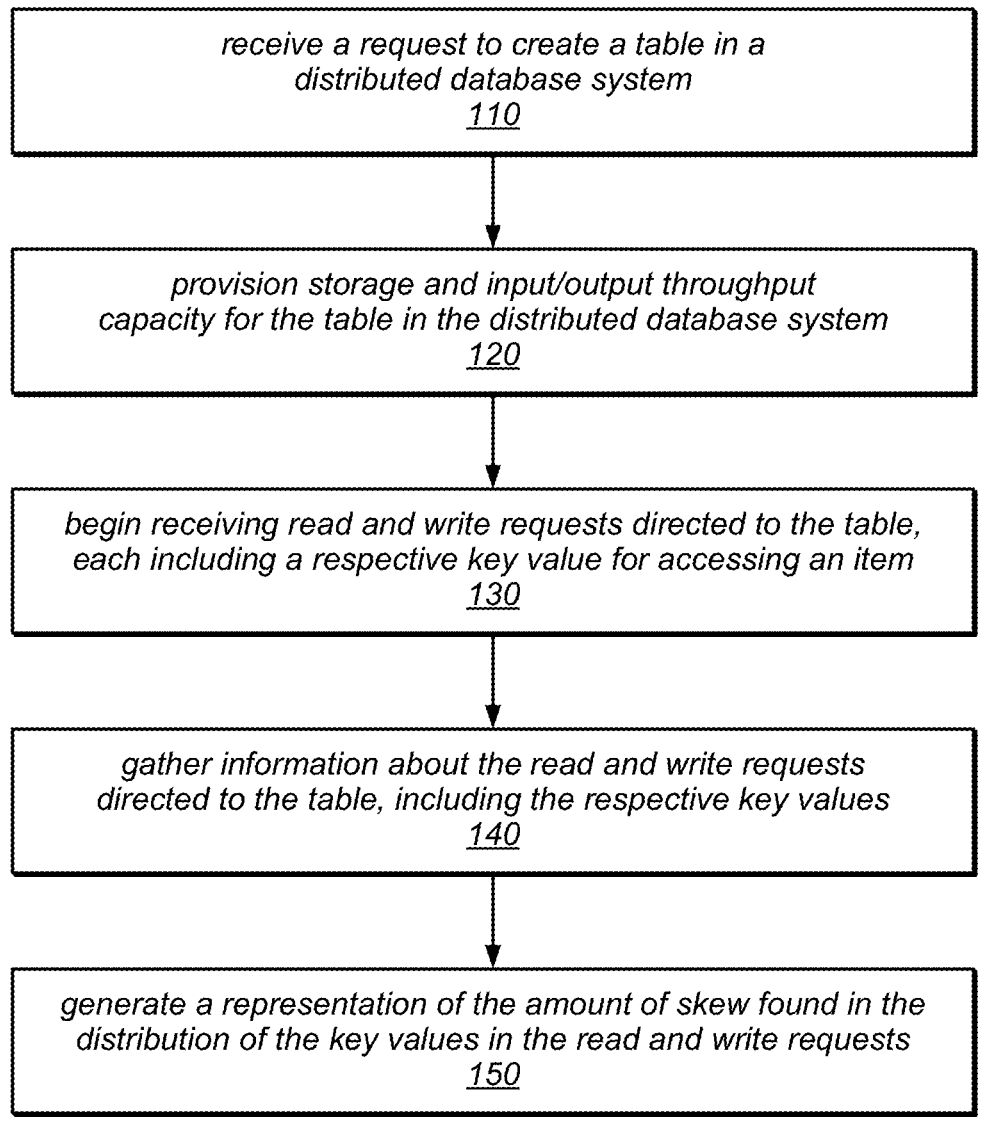
FIG. 1 is a flow diagram illustrating one embodiment of a method for generating a representation of the skew in the distribution of read and/or write requests across the key space of a database table.

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION

Customers may receive database services from a web-based services provider and may negotiate with the service provider to obtain access to a guaranteed amount of resources for those services, including storage resources and input/output throughput capacity. In some cases, when the distribution of a customer's requests across a database table is uneven, the database service may throttle (rather than service or satisfy) some of the requests even if the customer has not exceeded their negotiated guanteed throughput. In some embodiments, the database systems described herein may generate and/or publish skew-related reports or metrics that may help customers understand when they have a problematic traffic pattern. For example, in some embodiments, the database system may publish a metric that indicates a measure of the degree of skew in their request distribution (e.g., a measure of the amount of deviation from a uniform distribution of database accesses across a customer table). The database system may generate and publish skew-related information at the request of a client (e.g., a customer or a client application), and/or may make skew-related information available to client applications, in various embodiments.

More specifically, the database systems described herein may provide guaranteed throughput capacity for customers at a level for which they are willing to pay. For example, when requesting database services from one of these systems, a customer may request that a database table be created that has a specified guaranteed throughput capacity, where the desired throughput capacity is specified on the basis of reads per second (RPS) and writes per second (WPS). In some embodiments, the database system may provision enough resource capacity to guarantee that this throughput capacity is provided, given some assumptions about the customer's workload as directed to the table. Therefore, the guaranteed throughput capacity may sometimes be referred to herein as "provisioned capacity". In some embodiments, the throughput capacity may be guaranteed by the database system based on an assumption that the items stored in and retrieved from the table are uniform in size (e.g., the guarantee may be based on an assumption that all of the items have a size of 2 KB). In such embodiments, customers whose items do not follow this assumption may use simple math to compute the throughput capacity they should expect by normalizing their anticipated workload to one expressed in terms of 2 KB items.

In some embodiments, each of the items maintained in a database table on behalf of a customer may be stored in a particular partition of the table and/or subsequently accessed in the table using a hash of a respective primary key value associated with the item. In some such embodiments, the negotiated throughput capacity may be guaranteed based on an assumption that the customer's requests are uniformly distributed across the table (e.g., across the theoretical key space for the table). In other words, in guaranteeing throughput capacity, the database system may assume that a request for an item with a primary key value (e.g., an item identifier value) of "123" is just as likely to be requested as an item with any other primary key value. When a customer's workload deviates significantly from this assumption, the database system may reject some portion of the customer's requests even if the customer is not consuming their total guaranteed amount of throughput capacity.

In some embodiments, this "early throttling" may occur, at least in part, because of the partitioning of the table and (more specifically) the corresponding partitioning of resources for each of the partitions of the table. For example, if a customer requests that a table be created with 150 RPS of provisioned throughput capacity, the database system may create two partitions, each with enough resources to support a maximum of 75 RPS. As noted above, when a customer issues a database operation targeting a particular item in the table, the database system may use a hash of the item's primary key to determine which of the two partitions hosts the item. In this example, if the customer issues requests for a single item at 100 RPS (which exceeds a single partition's 75 RPS limit), at least 25 RPS may be rejected by the database system, even though the customer may not have exceeded their overall guaranteed amount of throughput capacity (e.g., 150 RPS of total provisioned capacity). In another example, if a customer issues requests at a rate of 75 RPS to each of two items, there are two possible outcomes. If both items are hosted on the same partition, 50% of the requests may be throttled, since the partition may support only 75 RPS. However, if the customer is lucky and the items are hosted on separate partitions, it may be the case that none of the requests will be throttled (assuming there is no other customer traffic on the two partitions).

In some embodiments, the distributed database systems described herein may provide customers with metrics about the distribution of their requests, including metrics that indicate the amount of skew in the distribution of their requests across their tables. With this information, customers may be able to detect any mismatches between their workloads and the capabilities of the database system (or, more specifically, the database instances that provide resources for their tables), and to take actions to reverse or prevent degradations in the quality of service they experience. In various embodiments, the distributed database systems described herein may provide clients with skew-related information as a service in real-time or may provide post-execution analysis of various request logs and/or other skew-related information to generate skew-related reports profiling the uniformity of distribution of database requests (and corresponding item accesses) across the item space (or the corresponding key space) of their database tables.

For example, in some embodiments, the database system may generate and publish two skew-related metrics on behalf of customers: a ReadSkew metric, and a WriteSkew metric. Each of these metrics (which may be referred to herein as a "skew coefficient") may range in value from zero to 100 percent, and may represent (or be derived from) a ratio of the number of accesses to the "hottest" part of the key space for a table to the number of accesses to the average part of the key space for the table. In this example, the higher the value, the more the distribution deviates from a uniform distribution and, as a result, the smaller the portion of the customer's provisioned throughput capacity the customer will be able to achieve without also experiencing request throttling. On the other hand, if the skew metric value is 0 (indicating a uniform distribution of accesses across the key space), a customer is more likely to be able to achieve their provisioned throughput without experiencing request throttling. In some embodiments, the database system may be configured to perform a heat type analysis across the key space for a particular database table, and to generate and publish (or otherwise present to a customer) various skew-related heat maps, as described in more detail below.

Note that in some cases and for some customer uses (e.g., for some client applications) it may not be necessary to identify precisely which portions of the key space are over-represented in the distribution of accesses to a table to provide useful information to the customer/client. Instead, it may be sufficient to report that the distribution is non-uniform, or to report a measure of the non-uniformity. Given this information, the customer/client may decide to dig deeper into the causes of the non-uniformity and to determine whether to take corrective action to better tune the configuration or parameters of their database table to better match the workload. For example, the customer may analyze whether hot key read accesses are mostly directed to memory, rather than to disk, in which case the non-uniform distribution may not impact performance as much as if most of those read accesses are to disk. In another example, while the database system may initially provision equal portions of the provisioned resources (e.g., input/output throughput capacity) for each partition of the table, given the information in a skew report, the system or the customer/client may choose to re-balance the provisioned capacity (e.g., non-uniformly) between the partitions to better match the actual traffic.

Also note that in some cases and for some customer uses (e.g., for some client applications) it may be acceptable for the accesses across a database table (or key space thereof) to be non-uniform, especially on a temporary basis. For example, different hash key ranges may be more heavily loaded than others at different times, and the extra load may be handled using shared burst capacity, in some embodiments. In general, the techniques described herein may be useful for generating reports that help customers/clients balance provisioned and/or unreserved resources of a distributed database system in which each partition (or other collection of items in a table) has access to finite resources (whether or not any of those resources are specifically reserved or provisioned for the exclusive use of a table or its partitions). Note also that these techniques may be applied (and may be useful) in single-tenant or multi-tenant embodiments of the database systems described herein.

One embodiment of a method for generating a representation of the skew in the distribution of read and/or write requests across the key space of a database table is illustrated by the flow diagram in FIG. 1. As illustrated at 110, in this example, the method may include receiving a request to create a table in a distributed database system. The method may include provisioning storage capacity and input/output throughput capacity for the table in the distributed database system, as in 120. For example, the distributed database system may provision enough resource capacity to guarantee pre-determined amounts of read and/or write IOPS, according to the assumptions made by the system. Once the table has been created, the method may include beginning to receive read and/or write requests directed to the table, each including a respective key value for accessing an item, as in 130. Note that as described above, not all of the requests that are received may be serviced, even if the total provisioned throughput capacity for the table is not exceeded. Instead (e.g., if the distribution of accesses across different collections of items in the table is non-uniform) some of the requests may be throttled.

As illustrated in this example, the method may include gathering information about the read and write requests that are directed to the table, including their respective key values, as in 140. As described herein, this may include aggregating some request-related information in real-time or logging information about each requests as it is received and/or processed and storing it for subsequent analysis, in different embodiments. The method may also include generating a representation of the amount of skew found in the distribution of the key values in the read and write requests, as in 150. For example, the representation may indicate the extent of the deviation of the distribution from a uniform distribution across the space of key values. As described herein, this may be generated in real-time as requests are directed to the table or may be generated from information obtained from request logs that were previously stored for the purpose of performing a skew analysis.

In some embodiments, a database service that implements a multi-tenant environment would typically partition data across multiple storage nodes and co-locate tables that are maintained on behalf of different customers together (e.g., on the same storage nodes and/or in the same database instance). A multi-tenant database service would typically handle security, quality of service compliance, service level agreement enforcement, service request metering, and/or other table management activities for the tables it hosts for different clients collectively. This multi-tenant model tends to decrease the cost of database service for customers, at least in the aggregate. However, if a client desires to receive database services in a very high-scale use case (e.g., one in which the client requires a throughput of 1 million reads per second and/or 1 million writes per second), a single-tenant model may be more cost effective for the client than a multi-tenant environment. For example, including the functionally required to support multi-tenancy and to provide security, compliance/enforcement, and/or metering operations in the system may constrain (e.g., decrease) the amount of throughput that the system may be able to achieve for individual storage nodes. In some embodiments, a computing system that provides database services to clients may provide both multi-tenant and single-tenant environments in which tables may be created, maintained, and/or managed on behalf of clients. In some such embodiments, when receiving and servicing requests directed to a table hosted in a single-tenant environment, the system may elide at least some of the administrative operations that would be performed when servicing requests directed to tables hosted in a multi-tenant environment (e.g., some authentication and/or metering operations). For example, since a database service that implements a single-tenant environment may isolate the tables it maintains on behalf of different clients from each other (e.g., maintaining them on different storage nodes and/or in different database instances), some or all of these operations may not be required in order to securely and efficiently manage the table and to service requests directed to it.

In some embodiments, tables may be moved from a single-tenant environment to a multi-tenant environment, or vice versa, automatically by the system (e.g., dependent on an observed, expected, or desired throughput) or in response to an explicit request from a client to do so (e.g., in order to increase throughput or reduce cost). The underlying system may create database instances for the different types of environments using different underlying database types while exposing the same functionality and/or interfaces to the clients for tables created in the two types of environments. For example, in one embodiment, database instances created in a multi-tenant environment may be implemented as non-relational database, while database instances created in a single-tenant environment may be implemented as relational databases, but the application programming interfaces (APIs) and/or graphical user interfaces (GUIs) for interacting with these database instances and/or the tables hosted therein may expose the same functionality to clients. In some embodiments, clients may experience the same predictability and scalability (including, e.g., automatic scaling) for tables hosted in database instances in either environment. In some embodiments, a request to create a database instance (or table) may specify the environment type (e.g., multi-tenant or single-tenant). In other embodiments, the selection of an environment type in which to create a requested database instance (or table) may be based on a pre-determined policy specifying a default or initial selection for database instances created in the database system. In database systems that support both a multi-tenant model and a single-tenant mode, a client may be able to make tradeoffs between latency, predictability, and throughput, in some embodiments.

Figure 2:
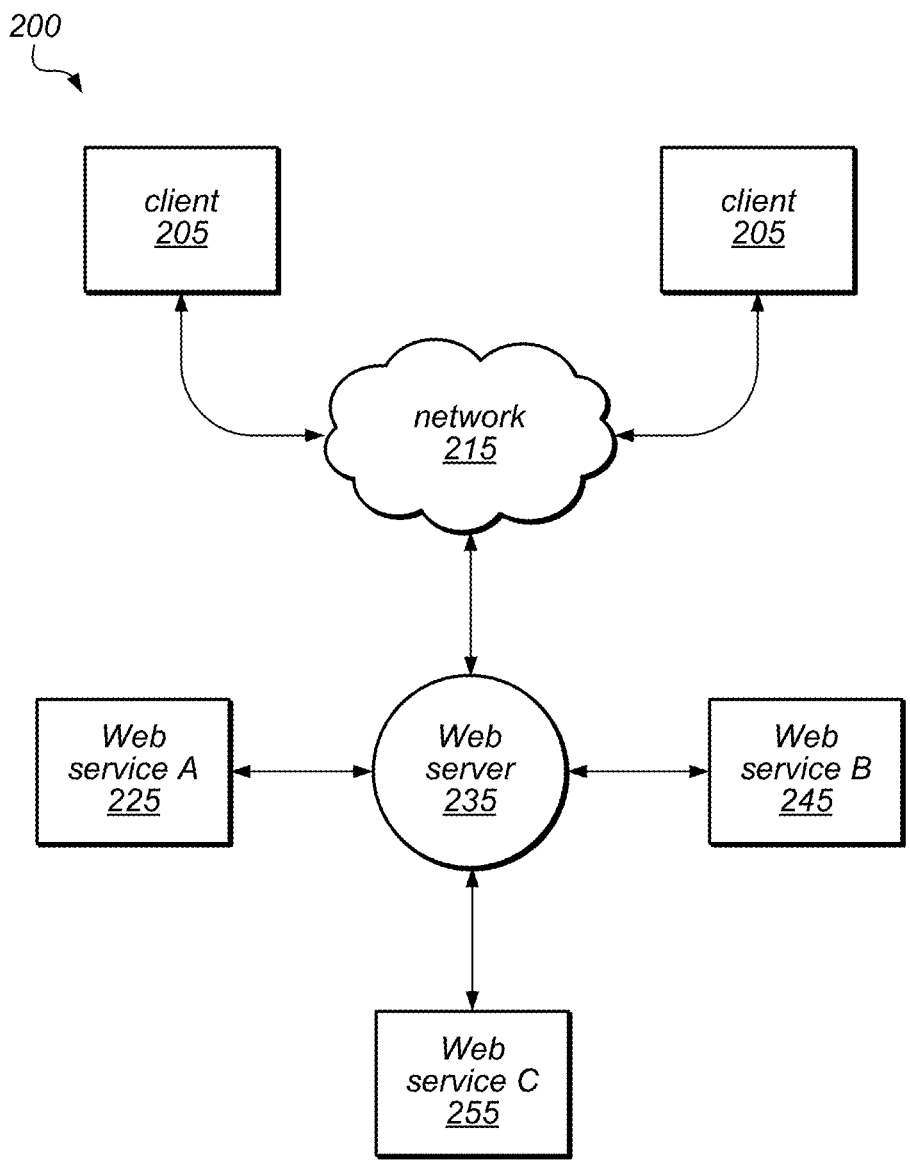
FIG. 2 is a block diagram illustrating one embodiment of a system that provides various Web-based services to clients.

Various techniques described herein may be employed in local or remote computing systems, including systems that provide services to users (e.g., subscribers) over the Internet or over other public or private networks, such as virtual private networks and connections to services in a virtual private cloud (VPC) environment. FIG. 2 illustrates a block diagram of a system that provides various Web-based services to clients, according to one embodiment. In this example, system 200 includes one or more clients 205. In this example, the clients 205 may be configured to interact with a Web server 235 via a communication network 215.

As illustrated in this example, the Web server 235 may be configured to process requests from clients 205 for various services, such as Web service A (225), Web service B (245), and Web service C (255), and to return results to the clients 205. Each of the web services may provide clients with one or more of: computational resources, database services, data storage services (e.g., maintaining data in one or more tables on behalf of a client), or any other types of services or shared resources.

Figure 3:
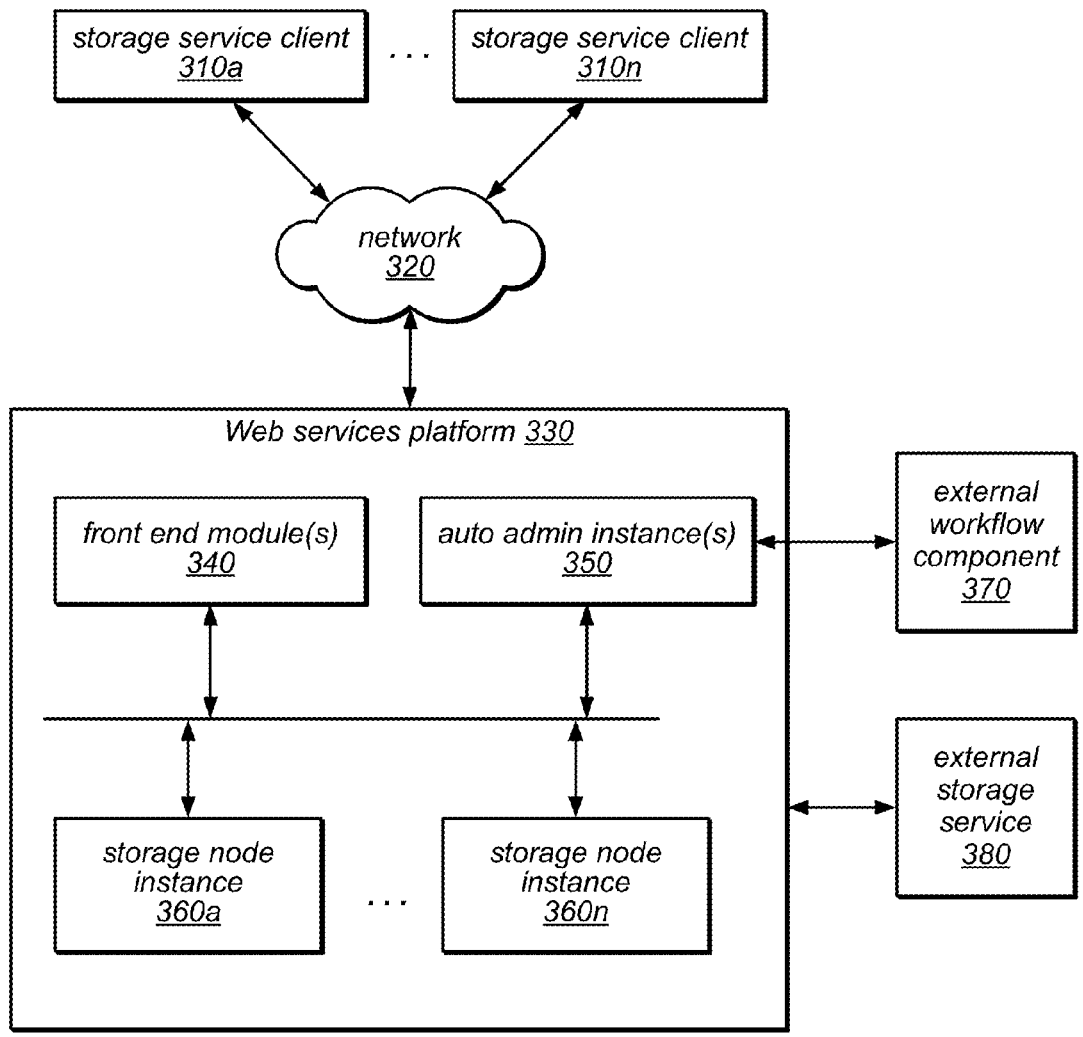
FIG. 3 is a block diagram illustrating one embodiment of a system architecture that is configured to implement Web services-based data storage services.

One embodiment of a system architecture that is configured to implement Web services-based data storage services such as those described herein is illustrated in FIG. 3. It is noted that where one or more instances of a given component may exist, reference to that component herein below may be made in either the singular or the plural. However, usage of either form is not intended to preclude the other. In various embodiments, the components illustrated in FIG. 3 may be implemented directly within computer hardware, as instructions directly or indirectly executable by computer hardware (e.g., a microprocessor or computer system), or using a combination of these techniques. For example, the components of FIG. 3 may be implemented by a distributed system including a number of computing nodes (or simply, nodes), such as the example computer system illustrated in FIG. 17 and described below. In various embodiments, the functionality of a given storage service system component may be implemented by a particular computing node or may be distributed across several computing nodes. In some embodiments, a given computing node may implement the functionality of more than one storage service system component.

Generally speaking, storage service clients 310*a*-310*n* may encompass any type of client configurable to submit web services requests to Web services platform 330 via network 320. For example, a given storage service client 310 may include a suitable version of a web browser, or a plug-in module or other type of code module configured to execute as an extension to or within an execution environment provided by a web browser to provide database or data storage service clients (e.g., client applications, users, and/or subscribers) access to the services provided by Web services platform 330. Alternatively, a storage service client 310 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage service client 310 may be an application configured to interact directly with Web services platform 330. In various embodiments, storage service client 310 may be configured to generate web services requests according to a Representational State Transfer (REST)-style web services architecture, a document- or message-based web services architecture, or another suitable web services architecture.

In some embodiments, storage service client 310 may be configured to provide access to web services-based storage to other applications in a manner that is transparent to those applications. For example, storage service client 310 may be configured to integrate with an operating system or file system to provide storage in accordance with a suitable variant of the storage model described herein. However, the operating system or file system may present a different storage interface to applications, such as a conventional file system hierarchy of files, directories and/or folders. In such an embodiment, applications may not need to be modified to make use of the storage system service model described herein. Instead, the details of interfacing to Web services platform 330 may be coordinated by storage service client 310 and the operating system or file system on behalf of applications executing within the operating system environment.

Storage service clients 310 may convey web services requests to and receive responses from Web services platform 330 via network 320. In various embodiments, network 320 may encompass any suitable combination of networking hardware and protocols necessary to establish web-based communications between clients 310 and platform 330. For example, network 320 may generally encompass the various telecommunications networks and service providers that collectively implement the Internet. Network 320 may also include private networks such as local area networks (LANs) or wide area networks (WANs) as well as public or private wireless networks. For example, both a given client 310 and Web services platform 330 may be respectively provisioned within enterprises having their own internal networks. In such an embodiment, network 320 may include the hardware (e.g., modems, routers, switches, load balancers, proxy servers, etc.) and software (e.g., protocol stacks, accounting software, firewall/security software, etc.) necessary to establish a networking link between given client 310 and the Internet as well as between the Internet and Web services platform 330. It is noted that in some embodiments, storage service clients 310 may communicate with Web services platform 330 using a private network rather than the public Internet. For example, clients 310 may be provisioned within the same enterprise as the data storage service (and/or the underlying system) described herein. In such a case, clients 310 may communicate with platform 330 entirely through a private network 320 (e.g., a LAN or WAN that may use Internet-based communication protocols but which is not publicly accessible).

Generally speaking, Web services platform 330 may be configured to implement one or more service endpoints configured to receive and process web services requests, such as requests to access tables maintained on behalf of clients/users by a database service or a data storage service, and/or the items and attributes stored in those tables. For example, Web services platform 330 may include hardware and/or software configured to implement various service endpoints and to properly receive and process HTTP-based web services requests directed to those endpoints. In one embodiment, Web services platform 330 may be implemented as a server system configured to receive web services requests from clients 310 and to forward them to various components that collectively implement a data storage system for processing. In other embodiments, Web services platform 330 may be configured as a number of distinct systems (e.g., in a cluster topology) implementing load balancing and other request management features configured to dynamically manage large-scale web services request processing loads.

As illustrated in FIG. 3, Web services platform 330 may include one or more front end modules 340 (which may be configured to receive, authenticate, parse, throttle and/or dispatch or route service requests to particular ones of the storage node instances, gather information to be used in generating various skew-related reports, and/or aggregate, compute and present skew-related metrics, among other things), one or more administrative components, or auto admin instances, 350 (which may be configured to provide a variety of visibility and/or control functions, as described in more detail herein), and a plurality of storage node instances (shown as 360*a*-360*n*), each of which may maintain and manage one or more tables on behalf of clients/users or on behalf of the data storage service (and its underlying system) itself. Some of the functionality provided by each of these types of components is described in more detail herein, according to various embodiments. Note that in some embodiments, Web services platform 330 may include different versions of some of the components illustrated in FIG. 3 to provide functionality for creating, accessing, and/or managing tables maintained in database instances within a single-tenant environment than those that provide functionality for creating, accessing, and/or managing tables maintained in database instances within a multi-tenant environment. In other embodiments, functionality to support both multi-tenant and single-tenant environments may be included in any or all of the components illustrated in FIG. 3. Note also that in various embodiments, one or more database instances may be implemented on each of the storage nodes 360*a*-360*n*, and each may store tables on behalf of clients. In some embodiments, some of these database instances may operate as if they were in a multi-tenant environment, and others may operate as if they were in a single-tenant environment. In some embodiments, database instances that operate as in a multi-tenant environment may be implemented on different computing nodes (or on different virtual machines executing on a single computing node) than database instances that operate as in a single-tenant environment.

In various embodiments, Web services platform 330 may be configured to support different types of web services requests. For example, in some embodiments, platform 330 may be configured to implement a particular web services application programming interface (API) that supports a variety of operations on tables that are maintained and managed on behalf of clients/users by the data storage service system (and/or data stored in those tables). Examples of the operations supported by such an API are described in more detail herein.

In addition to functioning as an addressable endpoint for clients' web services requests, in some embodiments Web services platform 330 may implement various client management features. For example, platform 330 may coordinate the metering and accounting of client usage of web services, including storage resources, such as by tracking the identities of requesting clients 310, the number and/or frequency of client requests, the size of tables and/or items stored or retrieved on behalf of clients 310, overall storage bandwidth used by clients 310, class of storage requested by clients 310, and/or any other measurable client usage parameter. Platform 330 may also implement financial accounting and billing systems, or may maintain a database of usage data that may be queried and processed by external systems for reporting and billing of client usage activity. In some embodiments, platform 330 may include a lock manager and/or a bootstrap configuration (not shown).

In various embodiments, a database service or data storage service may be implemented on one or more computing nodes that are configured to perform the functionality described herein. In some embodiments, the service may be implemented by a Web services platform (such as Web services platform 330 in FIG. 3) that is made up of multiple computing nodes, each of which may perform one or more of the functions described herein. Various collections of the computing nodes may be configured to provide the functionality of an auto-admin cluster, a cluster of resources dedicated to the data storage service, and a collection of external resources (which may be shared with other Web services or applications, in some embodiments).

In some embodiments, the external resources with which the system interacts to provide the functionality described herein may include an external workflow component, illustrated in FIG. 3 as external workflow component 370. External workflow component 370 may provide a framework through which other components interact with the external workflow system. In some embodiments, Web services platform 330 may include an access API built on top of that framework (not shown). This interface may allow the system to implement APIs suitable for the usage patterns expected to be experienced by the data storage service. In some embodiments, components or modules of the system that use external workflow component 370 may include these interfaces rather than interfacing directly to the interfaces provided by external workflow component 370. In some embodiments, the Web services platform 330 may rely on one or more external resources, such as an external storage service 380, and/or other external (and in some cases shared) external resources, in addition to external workflow component 370. In some embodiments, external workflow component 370 may be used to perform distributed operations, such as those that extend beyond a particular partition replication group.

In some embodiments, the database systems described herein may support seamless scaling of user tables in a "fully shared nothing" type architecture. For example, in some embodiments, each database partition may be implemented as a completely independent parallel computation unit. In such embodiments, the system may not provide distributed coordination across partitions or support batch "put" operations and/or multi-statement transactions. In some embodiments, as long as the workload distribution is well spread across partitions, an increase in the number of partitions may result in a larger usable table size and/or increased throughput capacity for service requests. In some embodiments, live repartitioning (whether programmatic/automatic or explicitly initiated) may be employed to adapt to workload changes. In other words, in some embodiments, repartitioning (including partition moving, partition splitting, and other repartitioning operations) may be performed while service requests directed to the affected partitions continue to be received and processed (i.e. without taking the source partition off-line).

In some embodiments, a service (and/or underlying system) may support a variety of service offerings and/or throughput models. In some embodiments, the service may support a committed work throughput offering and/or a best effort offering. In some embodiments, a committed work throughput level may be specified in terms of a measure of normalized, logical work units (or logical service request units) over time, and may represent a work throughput level that is guaranteed by the system. For example, in systems that provide database or data storage services (e.g., in tables maintained on behalf of clients), a storage service client (e.g., a client application, user, or subscriber having access to the service) may specify a preference between multiple throughput options that are offered by the service, according to a variety of business models, subscription types, and/or payment models. For example, the client/user may indicate a preferred throughput model for a particular table through a parameter of a request to create the table, in some embodiments. In other embodiments, a client/user may specify a default throughput model for all tables created and maintained on their behalf by the data storage service. By supporting both a committed throughput model and a best effort throughput model (for which no throughput guarantees are made), the system may allow clients/users to make a trade-off between performance and cost, according to their needs and/or budgets. Other types of services may support a committed work throughput model and/or other throughput models.

A data storage service (and underlying system) that provides a committed throughput offering may be configured to pre-allocate capacity and/or resources for the creation, growth, and management of a table maintained on behalf of a client/user in response to traffic directed to the table, and not to overbook the resources and/or capacity of the storage node(s) on which that table is maintained. In some embodiments, tables maintained by the service (and underlying system) under a committed throughput model may be maintained in faster (and often more expensive) storage resources, such as high performance media (e.g., flash memory or Solid State Drive, or SSD, media), in order to provide extremely low latencies when servicing requests from the client/user. For example, the system may provide (and dedicate) a high ratio of fast/local memory to main (e.g., disk) memory for the maintenance of those tables (and various partitions thereof). While the storage resources allocated to a given table under a committed throughput model may in some cases be underutilized (at least some of the time), the client/user may value the predictable performance afforded by the committed throughput model more than the additional (and in some cases wasted) costs of dedicating more resources than may always be necessary for that table. Similarly, resources that are preallocated to other types of services to support a committed work throughput model may in some cases be underutilized (at least some of the time), but may provide the client/user with a predictable level of performance (e.g., in terms of availability and/or responsiveness).

As described herein, in some embodiments the systems described herein may support both a multi-tenant model and a single-tenant model. In such some embodiments, the client/user may indicate a preferred one of these tenancy models for a particular table through a parameter of a request to create the table. In other embodiments, a client/user may specify a default or initial tenancy model for all tables created and maintained on their behalf by the data storage service.

Figure 4A:
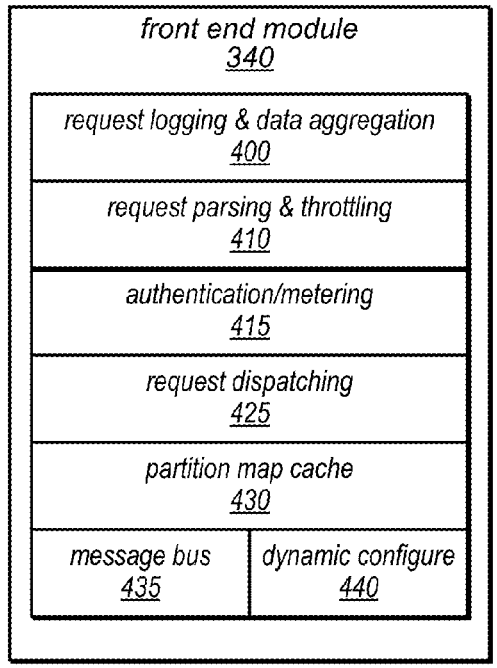
FIGS. 4A-4C are block diagrams illustrating various components of a Web services platform, according to one embodiment.
Figure 4B:
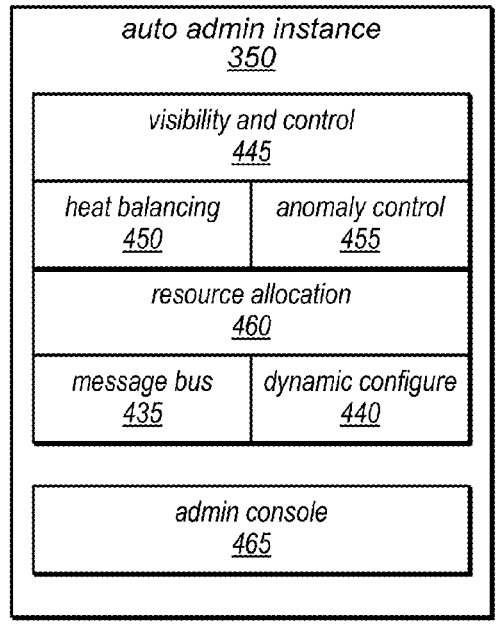
Figure 4C:
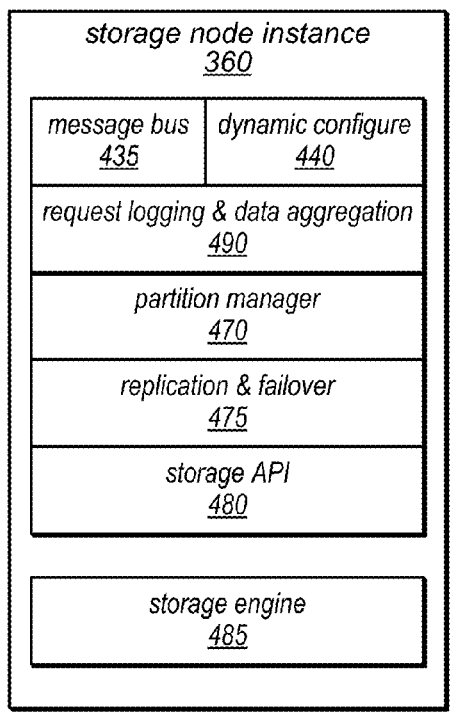

FIGS. 4A-4C illustrate various elements or modules that may be included in each of the types of components of Web services platform 330, according to one embodiment. As illustrated in FIG. 4A, a front end module 340 may include one or more modules configured to perform parsing and/or throttling of service requests (shown as 410), authentication and/or metering of service requests (shown as 415), dispatching service requests (shown as 425), logging and/or aggregation of request data (400), and/or maintaining a partition map cache (shown as 430). In addition to these component-specific modules, front end module 340 may include components that are common to multiple types of computing nodes that collectively implement Web services platform 330, such as a message bus (shown as 435) and/or a dynamic configuration module (shown as 440). In other embodiments, more, fewer, or different elements may be included in front end module 340, or any of the elements illustrated as being included in front end module 340 may be included in another component of Web services platform 330 or in a component configured to interact with Web services platform 330 to provide the data storage services described herein. In some embodiments, front end module 340 may be one of a fleet of front end modules 340 that serve as request routers for a distributed database system, and each of the front end modules 340 in the fleet may perform some or all of the logging and/or aggregation functions described herein for generating and presenting skew-related metrics and/or reports.

As illustrated in FIG. 4B, auto admin instance 350 may include one or more modules configured to provide visibility and control to system administrators (shown as 445), or to perform heat balancing (shown as 450), and/or anomaly control (shown as 455), resource allocation (shown as 460). Auto admin instance 350 may also include an admin console 465, through which system administrators may interact with the data storage service (and/or the underlying system). In some embodiments, admin console 465 may be the primary point of visibility and control for the data storage service (e.g., for configuration or reconfiguration by system administrators). For example, admin console 465 may be implemented as a relatively thin client that provides display and control functionally to system administrators and/or other privileged users, and through which system status indicators, metadata, and/or operating parameters may be observed and/or updated. In addition to these component-specific modules, auto admin instance 350 may also include components that are common to the different types of computing nodes that collectively implement Web services platform 330, such as a message bus (shown as 435) and/or a dynamic configuration module (shown as 440). In other embodiments, more, fewer, or different elements may be included in auto admin instance 350, or any of the elements illustrated as being included in auto admin instance 350 may be included in another component of Web services platform 330 or in a component configured to interact with Web services platform 330 to provide the data storage services described herein.

As illustrated in FIG. 4C, storage node instance 360 may include one or more modules configured to provide partition management (shown as 470), to implement replication and failover processes (shown as 475), and/or to provide an application programming interface (API) to underlying storage (shown as 480). As illustrated in this example, each storage node instance 360 may include a storage engine 485, which may be configured to maintain (i.e. to store and manage) one or more tables (and associated table data) in storage 480 (which in some embodiments may be a non-relational database) on behalf of one or more clients/users. In some embodiments, each storage node instance 360 may also include a request logging and data aggregation component 490, which may perform some or all of the request logging, skew-related data collection, and/or data aggregation functions described herein for generating (e.g., computing) and presenting skew-related metrics and/or reports. In addition to these component-specific modules, storage node instance 360 may include components that are common to the different types of computing nodes that collectively implement Web services platform 330, such as a message bus (shown as 435) and/or a dynamic configuration module (shown as 440). In other embodiments, more, fewer, or different elements may be included in storage node instance 360, or any of the elements illustrated as being included in storage node instance 360 may be included in another component of Web services platform 330 or in a component configured to interact with Web services platform 330 to provide the data storage services described herein.

Note that in some embodiments, it may not be necessary to perform some or all of the throttling, authentication, and/or metering operations that would typically be provided by front end module 340 in multi-tenant environments for tables operating in a single-tenant environment. For example, the system may be configured to elide these operations when servicing requests directed to tables in a single-tenant environment, but to perform them when servicing requests directed to tables in a multi-tenant environment. Similarly, in some embodiments, some of the operations illustrated as being performed by auto admin instance 350 (e.g., heat balancing and/or resource allocation) may or may not be applied in managing tables in a single-tenant environment. However, other operations illustrated as being performed by auto admin instance 350 (or various modules thereof) may be applied in the creation and/or management of tables in both multi-tenant and single-tenant environments.

The systems underlying the database or data storage service described herein may store data on behalf of storage service clients (e.g., client applications, users, and/or subscribers) in tables containing items that have one or more attributes. In some embodiments, the data storage service may present clients/users with a data model in which each table maintained on behalf of a client/user contains one or more items, and each item includes a collection of attributes. The attributes of an item may be a collection of name-value pairs, in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In other embodiments, more than one item may be identified by a single primary key value. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, unlike in traditional databases, the tables maintained by the database or data storage service (and the underlying storage system) may have no pre-defined schema other than their reliance on the primary key. Note that in some embodiments, if an attribute is included in an item, its value cannot be null or empty (e.g., attribute names and values cannot be empty strings), and, and within a single item, the names of its attributes may be unique.

In some embodiments, the systems described herein may employ a somewhat limited indexing and/or query model in order to provide massive (i.e. virtually unlimited) scaling, predictability, and simplicity for users/subscribers or client applications. For example, in some embodiments, data may be indexed and partitioned (e.g., partitioned in the underlying database) by a primary key only. In such embodiments, the primary key to be used for indexing data in a user table may be specified by the user at the time that the table is created on the user's behalf. Thereafter, the partitioning of the user's data may be handled by the system, and abstracted from the user. In some embodiments, the primary key used for indexing data may consist of a single attribute hash key. In other embodiments, the primary key used for indexing and/or partitioning data may be a composite key comprising a hash key component and another component, sometimes referred to herein as a range key component. In various embodiments, queries may be supported against indexed attributes, and a full table scan function may be provided (e.g., to support troubleshooting). In some embodiments, users may define secondary indexes for a table based on one or more attributes other than those of the primary key, and then may query for items using the indexes they have defined. For example, in some embodiments the system may support the creation of creating secondary indexes on-the-fly (e.g., using a createIndex API), and these secondary indexes may scale automatically based on storage requirements (e.g., increasing or decreasing data volume) and/or read/write traffic. In some embodiments, such secondary indexes may be asynchronously updated as items in the table are updated.

In various embodiments, the service (and/or the underlying system) may enforce pre-determined size limits on table names, items, attribute values, primary key values, and/or attribute names. For example, in some embodiments, the total size of all the attribute names and values in an item (i.e. the row size) may be limited.

The database and data storage services described herein (and/or the underlying system) may provide an application programming interface (API) for requesting various operations targeting tables, items, and/or attributes maintained on behalf of storage service clients. In some embodiments, the service (and/or the underlying system) may provide both control plane APIs and data plane APIs. The control plane APIs provided by the data storage service (and/or the underlying system) may be used to manipulate table-level entities, such as tables and indexes and/or to reconfigure various tables (e.g., in response to the findings presented in a skew report). These APIs may be called relatively infrequently (when compared to data plane APIs). In some embodiments, the control plane APIs provided by the service may be used to create tables, import tables, export tables, delete tables, explore tables (e.g., to generate various performance reports or skew reports), modify table configurations or operating parameter for tables (e.g., by modifying the amount of throughput capacity, adding storage capacity for additional read replicas, splitting partitions or moving partitions), and/or describe tables. In some embodiments, control plane APIs that perform updates to table-level entries may invoke asynchronous workflows to perform a requested operation. Methods that request "description" information (e.g., via a describeTables API) may simply return the current known state of the tables maintained by the service on behalf of a client/user. The data plane APIs provided by the data storage service (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

As noted above, the control plane APIs supported by the service may include APIs that perform updates on tables (e.g., a CreateTable API and/or a DeleteTable API). In various embodiments, these APIs may invoke asynchronous workflows to perform the requested operation. In addition, the service may support methods that return the current known state (e.g., a DescribeTables API) or that return various skew metrics or reports (e.g., an ExploreTable API). In some embodiments, a common use model may be for a client to request an action (e.g., using a CreateTable API), and then to poll on its completion via the corresponding description API (e.g., DescribeTables). Other supported methods may be used to modify table configurations or parameters (e.g., a ModifyTableThroughput API, a PurchaseTableCapacity API, a SplitTable API, or a MoveTable API).

In some embodiments in which the system provides database or data storage services to clients, the system may provide an application programming interface (API) that includes support for some or all of the following operations on data maintained in a table by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned. For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API Note that the amount of work required to satisfy service requests that specify these operations may vary depending on the particular operation specified and/or the amount of data that is accessed and/or transferred between the storage system and the client in order to satisfy the request.

In some embodiments, the system described herein may be configured to create and execute a database instance in a single-tenant environment on dedicated hardware (e.g., on a dedicated storage device) or on particular ones of the storage nodes in the system. In other embodiments, a database instance in a single-tenant environment may be created and may execute on a different virtual machine in a storage node than other database instances that are created and that execute on the same storage node. In some embodiments, the underlying software and/or hardware to implement the functionality for performing database operations that target tables in both types of environments (e.g., operations to store, retrieve, or delete data) may be the same (or substantially similar). However, since clients may be able to directly connect to database instances (and/or tables therein) in the single-tenant environment, there may not be a need for the system to provide an intermediate layer to provide security or other utilities required to support multi-tenancy. Instead, authentication checks may be skipped and clients may submit requests to perform operations on these tables directly to the underlying storage node(s), e.g., on a low-latency path.

For example, in some embodiments, a client may submit a request to create a database instance (e.g., using a CreateDatabaseInstance API), and may submit a request for a description of a database instance (e.g., using a DescribeDatabaseInstance API), in response to which, the system may return a list of IP addresses at which the client may directly connect to the database instance (or a table therein) to perform various operations (e.g., create table, put item, get item, etc.). In general, a database instance in a multi-tenant environment may store tables for multiple different customers that all run within the same database instance. Therefore, the system may be required to keep clients from being able to access each other's tables using various security and authentication schemes. However, with a dedicated database instance in a single-tenant environment, the client may be given a specific IP address for the specific database instance, after which the client may configure a firewall group or another type of security group to limit the clients that are able to connect to that instance and/or create their own network connection to their table(s), e.g., a TCP connection that conforms to one of various open source protocols, in some embodiments.

Figure 5:
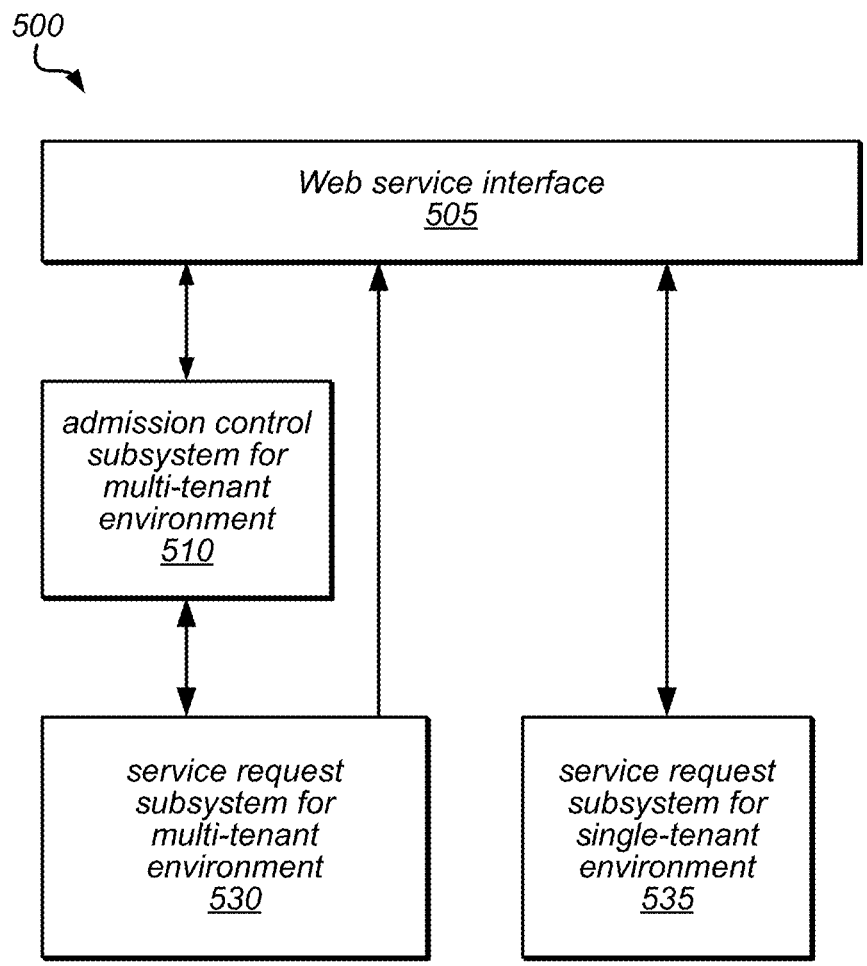
FIG. 5 is a block diagram illustrating subsystems of a system that provides various Web-based services to clients, according to one embodiment.

FIG. 5 is a block diagram illustrating a computing system 500 that provides various Web-based services to clients, according to some embodiments. For example, in some embodiments, computing system 500 may implement a Web server, such as Web services platform 330 illustrated in FIG. 3. In various embodiments, computer system 500 may be configured to allocate a variety of resources (which may include, for example, downstream services, database connections, input/output channels, computational resources, execution threads, a portion of system memory, disk memory or other persistent storage resources, or any other constrained resources) from one or more pools of resources to service requests received by computing system 500 in order to provide services requested by various clients. For example, in order to satisfy a service request directed to a data storage system, the data storage system may allocate one or more database connections, input/output channels, storage resource portions and/or other resources for each normalized, logical work unit or logical service request unit required to satisfy the request. As illustrated in this example, computing system 500 may include a Web service interface 505, an admission control subsystem 510 for use in a multi-tenant environment, a service request subsystem 530 for managing requests directed to tables in a multi-tenant environment, and a service request subsystem 535 for managing requests directed to tables in a single-tenant environment.

In this example, Web services interface 505 may be configured to receive requests for services from various clients and to communicate with admission control subsystem 510 to facilitate the performance of those services on behalf of the clients. For example, in some embodiments, admission control subsystem 510 may be configured to determine which and/or how many service requests that are directed to tables in a multi-tenant environment to accept from various clients, and may communicate with a service request subsystem 530 to accept and/or service one or more received service requests. In some embodiments, admission control subsystem 510 may be configured to determine which and/or how many service requests to accept dependent on a maximum request rate for the system and/or for a particular client, application, target, request type, or operation. As described herein, the maximum request rate may be dynamically adjusted dependent on the current work throughput rate and/or a target or committed work throughput rate. In other embodiments, service requests may be managed using work-based tokens. In various embodiments, admission control subsystem 510 may implement one or more admission control mechanisms, including any admission control mechanism suitable for managing service requests that have non-uniform workloads.

In some embodiments, if a service request is accepted for servicing by admission control subsystem 510, service request subsystem 530 may in turn be configured to allocate (or initiate allocation of) one or more resources needed to perform the requested services to those requests, and/or to return results to the client via Web services interface 505. For example, in embodiments in which the system provides data storage services, in response to a query request that is accepted by admission control subsystem 510, service request subsystem 530 may access the table to which the query is directed and may return the query results to the client via Web services interface 505. In some embodiments, admission control subsystem 510 may be configured to throttle and otherwise manage service requests that have non-uniform workloads (e.g., adjusting a maximum request rate dependent on a current work throughput rate. In other embodiments, this functionality may be provided by another component of the system, which may provide the maximum request rate to the admission control subsystem for use in throttling service requests. In some embodiments, admission control subsystem 510 may implement a "leaky bucket" based admission controller. In some embodiments, Web service interface 505 may utilize predefined instructions or communications, such as via defined application protocol interfaces (APIs), to communicate with admission control subsystem 510 and/or other components of computing system 500 on behalf of a client.

In this example, service request subsystem 535 may be configured to allocate (or initiate allocation of) one or more resources needed to perform requested services that are directed to tables in a single-tenant environment, and/or to return results to the client via Web services interface 505, without performing all of the operations described above as being performed by admission control subsystem 510. For example, in embodiments in which the system provides database or data storage services for tables in a single-tenant environment, in response to a query request, service request subsystem 535 may access the table to which the query is directed and may return the query results to the client via Web services interface 505.

Note that in various embodiments, the components illustrated in FIGS. 4A-4C and/or 5 may be implemented directly within computer hardware, as instructions directly or indirectly executable by computer hardware (e.g., a microprocessor or computer system), or as a combination of these techniques. For example, the components of the computing system 500 may be implemented by a distributed system including any number of computing nodes (or simply, nodes). In various embodiments, the functionality of a given component may be implemented by a particular node or distributed across several nodes. In some embodiments, a given node may implement the functionality of more than one of the component illustrated in FIGS. 4A-4C and/or 5.

Various techniques that may be implemented by a Web server (or an admission control subsystem or other component thereof) are described in more detail below, according to different embodiments. In general, any or all of the techniques described herein for managing the processing of service requests on behalf of clients may be performed by and/or implemented in an admission control module that is a component of a Web server. While several examples described herein are directed to systems that provide services over the Internet, in other embodiments, these techniques may be performed by and/or implemented in an admission control module or a similar component of another type of system that provides services to clients, and that is configured to receive, accept, and/or service requests on behalf of those clients.

As previously noted, the database systems described herein may be configured to generate and present various skew-related metrics and reports about the pattern and distribution of accesses to a given database table over time and across the table (e.g., across collections of the keys, or hashes of the keys, in the key space for the table). In different embodiments, these metrics and reports may include a Gini scoring type metric referred to as a "skew coefficient" for read accesses and/or write accesses, various heat maps (including those that indicate hot keys, hot collections of keys, hot collections of hashes of keys, hot partitions, etc.), request throttling and/or admission metrics, or other information indicating a measure of uniformity (or non-uniformity) of accesses to items in a table in a distributed database system. In some embodiments, some or all of the information needed to generate the skew-related metrics and reports may be gathered and/or aggregated automatically as part of the normal operation of the distributed database system. In other embodiments, some or all of the information needed to generate the skew-related metrics and reports may be gathered and/or aggregated in response to a request from a customer/client to collect or aggregated the information in order to explore the relationship between the performance of the database instance and the workload targeting a particular table. In other words, mechanisms for initiating the collection of skew-related information and/or for generating and presenting skew-related metrics and reports may be exposed to customers/clients so that they may be able determine how best to utilize the distributed database service.

As previously noted, in some embodiments, the model for provisioning input/output throughput capacity (e.g., IOPs) and for partitioning database tables may assume an ideal random traffic (e.g., a relatively uniform distribution of accesses across the tables). In such embodiments, customers whose table experience a non-random distribution of accesses (e.g., with a few hot keys being accessed often and a large number of cold keys being rarely accessed) may not be able to take full advantage of their provisioned throughput capacity. For example, if a table has two partitions, each partition may have the support of half of the total provisioned throughput capacity. In this example, if the user's request pattern is random, they should be able to take advantage of the total provisioned throughput capacity for the table. In such embodiments, the tables may also be partition for size, e.g., with the total provisioned storage capacity split equally between the two partitions as well. However, if the user's request (or access) pattern deviates significantly from a random (or uniform) distribution over the two partitions, this may result in a customer perception that the net throughput capacity of the table is lower than what was provisioned for the table.

As previously noted, the database systems described herein may generate and publish two skew-related metrics on behalf of customers: a ReadSkew metric, and a WriteSkew metric. Each of these metrics (or "skew coefficients") may range in value from zero to 100 percent, and may represent (or be derived from) a ratio of the number of accesses to the "hottest" part of the key space for a table to the number of accesses to the average part of the key space for the table. In other words, the higher the values of the skew coefficients, the more the distributions of read and/or write accesses deviate from a uniform distribution and, as a result, the smaller the portion of the customer's provisioned throughput capacity the customer will be able to achieve without also experiencing request throttling. On the other hand, if the skew metric values are 0 (indicating a uniform distribution of accesses across the key space), a customer is more likely to be able to achieve their provisioned throughput without experiencing request throttling.

Figure 6:
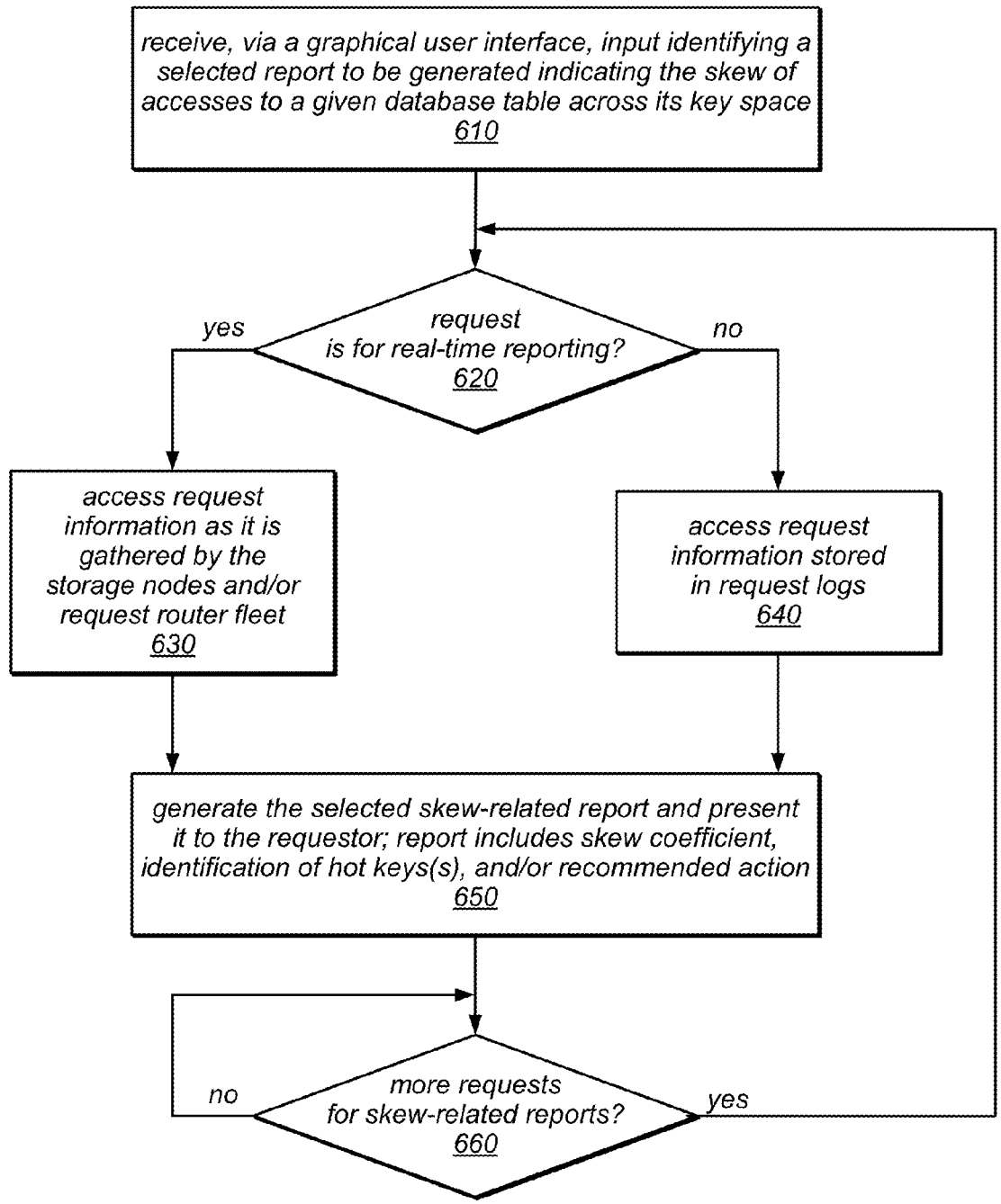
FIG. 6 is a flow diagram illustrating one embodiment of a method for generating one or more skew-related reports for accesses to a database table.

One embodiment of a method for generating one or more skew-related reports for accesses to a database table in a distributed database system is illustrated by the flow diagram in FIG. 6. As illustrated at 610, in this example, the method may include receiving, via a graphical user interface, input identifying a selected report to be generated indicating the skew of accesses to a given database table across its key space. If the request is for real-time skew reporting (shown as the positive exit from 620), the method may include accessing information about the requests as it is gathered by the storage nodes and/or request router fleet of the distributed database system, as in 630. Note that in some embodiments, information about the requests may be gathered by the storage nodes and/or request router fleet when the requests are received and/or routed. In other embodiments, information about the requests may be gathered by the storage nodes and/or request router fleet when the responses to those requests are returned. For example, in some embodiments, the information gathered for each request may include information about the size of the response (e.g., the amount of data returned in response to a query) or the amount of provisioned resources that were consumed in satisfying the request (e.g., the number of input/output operations performed or the consumed IOPS capacity), some of which may not be known or available when the request is received.

If the request is not for real-time skew reporting, but is for delayed skew reporting (shown as the negative exit from 620), the method may include accessing request information that was previously collected and stored in one or more request logs, as in 640. In either case, the method may include generating the selected skew-related report (based, at least in part, on the accessed information) and presenting it to the requestor, as in 650. In various embodiments, the gathered and/or accessed information about the each of the requests may include the primary key value included in the request, an identifier of the partition in which the targeted item is hosted, an indication of whether the request was serviced (admitted) or was rejected (throttled), the time at which the request was received, serviced, and/or routed to one of the storage nodes, the size of the response, the amount of provisioned resources that were consumed in satisfying the request, and/or any other information usable in generating various skew-related metrics and reports. As illustrated in this example, the report may include an identification of one or more hot keys and/or a recommended action to be taken to attempt to correct any skew indicated by the report.

As illustrated in FIG. 6, if there are more requests for skew-related reports (shown as the positive exit from 660), the method may include repeating the operations illustrated in 620-650 for each such request. This is illustrated by the feedback from 660 to 620. Otherwise (shown as the negative exit from 660), the database system components performing the operations illustrated in FIG. 6 may wait for another request for a skew report (shown as the feedback to 660) and/or may continue to collect and/or aggregate information about the distribution of accesses by requests across the database table (not shown).

In some embodiments, in addition to presenting various skew-related metrics (e.g., the ReadSkew and WriteSkew metrics described herein) to the customer/client, the distributed database systems described herein may be configured to present to customers/clients a recommendation about corrective actions that may be taken to improve the uniformity in the distribution of accesses across the table and/or may present (or provide instructions to access) documentation about various techniques for designing around non-uniformity (skew). For example, in some embodiments, the distributed database system may provide an UpdateTable mechanism (e.g., through a graphical user interface or API) that allows customers/clients to provision additional aggregate throughput. In some cases, provisioning additional throughput may result in moving hotter keys onto cooler partitions that have more available throughput capacity. In another example, the distributed database system may provide a mechanism (e.g., through a graphical user interface or API) that allows a customer/client to switch from consistent reads to eventually consistent reads for a given database table, which may give the customer/client access to more of its provisioned throughput capacity by utilizing the read-only replicas within each partition.

In some embodiments, since eventually consistent read workloads are generally cachable, using an in-memory cache or a distributed cache may serve to dramatically smooth out the accesses made to back end storage nodes by an application with a non-uniform workload. In another example, if a write or consistent read workload is inherently uneven, configuring a client application such that requests are retried following a rejection may help work around throttling, at the cost of overall latency. In this example, there may be a ceiling to the maximum throughput an item can receive (which may vary and which may not be exposed to the customer/client). Note also that some schema and workload combinations may not lend themselves well to the partitioning strategies of a given distributed database system (e.g., certain uses of hash+range schemas). In some embodiments, re-architecting the database schema and/or making changes in the client application may allow the customer/client to work around some of these types of mismatches.

In general, in distributed database systems in which customers are provided access to skew-related metrics (such as those described herein), the customers/clients may be able to observe (e.g., over time) whether their workloads are at risk of being throttled earlier than they intended. In some embodiments, customers may take action ahead of experiencing availability problems by following guidance presented to them through a console of the distributed database system, based on various skew-related metrics and reports presented to them, and/or based on other documentation for the distributed database system. For example, a customer may explore various skew-related metrics for a table (e.g., through an interactive console or by requesting and receiving various skew reports) prior to implementing an operation to increase the size of the table or to otherwise reconfigure the table. In this example, information gleaned from the skew-related metrics and reports may inform those operations, allowing the customer to avoid or prevent unexpected throttling following the execution of those operations. In some embodiments, skew-related metrics and reports such as those described herein may also help customers self-diagnose unexpected throttle rates and determine their own corrective actions (e.g., actions that are compatible with the goals of their applications).

Figure 7:
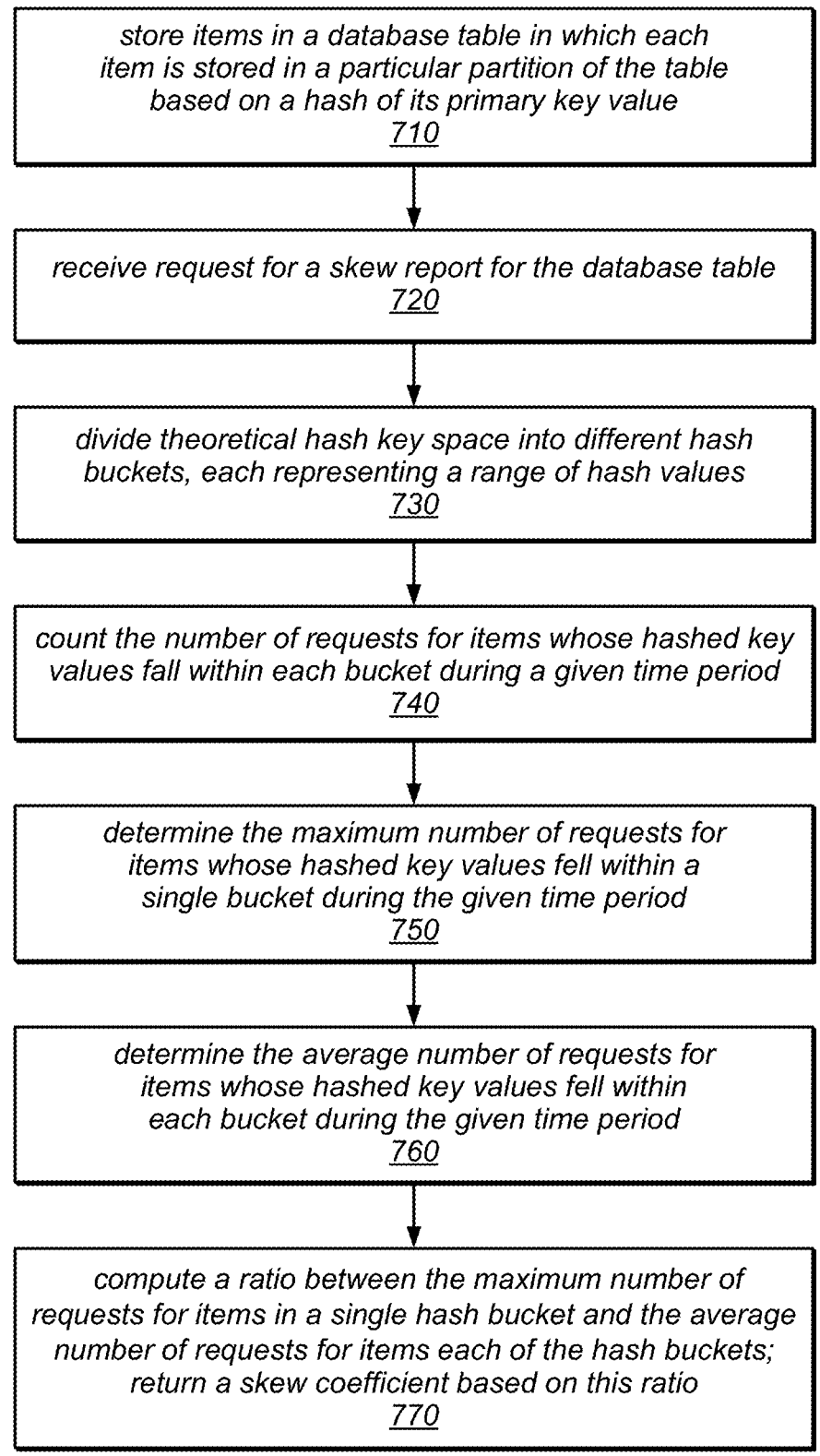
FIG. 7 is a flow diagram illustrating one embodiment of a method for generating a skew coefficient for accesses to a database table.

As previously noted, in different embodiments, the distributed database systems described herein may generate and present any of a variety of different measurements of skew. For example, in some embodiments, the systems may compute a skew coefficient that is similar to a Gini coefficient to score the uniformity of the request load (in terms of the number or percentage of requests per key or for each of multiple collections of keys within the key space). One method for computing such a skew component is illustrated in FIG. 7 and described below. Other skew metrics are described herein in relation to FIGS. 10-13 and 14A-14B.

Note that the skew coefficients described herein may be variants of the Gini coefficient, and each may comprise an aggregate measurement of the skew across the key space of a database table, which may in turn be used as a measure of the "equity" of accesses to the table. Typically, the Gini coefficient can range from a value of 0 to a value of 1, or may be expressed as a percentage ranging between 0 and 100, where a low Gini coefficient indicates a more equal distribution than higher Gini coefficients. As with the Gini coefficient, a skew coefficient of 0 may correspond to complete equality (e.g., perfect uniformity of the distribution of accesses to a table across collections of items in the table), and a skew coefficient of 1 may correspond to complete inequality.

More specifically, the skew coefficients generated by the distributed databse systems described herein may in some embodiments be calculated as a Gini coefficient over the request set (e.g., the set of possible hashed primary key values), equally partitioned into 1000 hash buckets. If this value is 0, then there is a perfect distribution of accesses over the request set, with zero skew. If this value is 1 the distribution is 100% skewed. In one embodiment, a skew coefficient G for read accesses and/or write accesses may be published as follows:

for G<0.1, return or display a value of 0
for 0.1<G<0.3, return or display a value of 1
otherwise, return or display a value of 2

In this example, a returned or displayed skew coefficient value may serve as an alarm or alert to a customer or to client software. In other words, in embodiments in which only a single aggregate skew metric is returned or displayed, this one skew metric may be something that a customer or client software can monitor and/or alert on (e.g., if it goes above a threshold). In the example above, a returned/displayed value of 0 may indicate that the distribution of accesses over the request set is acceptable (or "ok"), a returned/displayed value of 1 may serve as a warning that the distribution may be skewed to a small degree, and a returned/displayed value of 2 may serve to alarm the customer/client that the distribution is highly skewed.

In some embodiments, the algorithm for computing this skew-related metric may break the theoretical hash key space into a discrete number of hash buckets (e.g., 1000), and may count the number of requests associated with each hash bucket in a given time period (e.g., 5 minutes). The skew metric may then be computed as the ratio of the size of the largest hash bucket to the average hash bucket size. In this example, the formula for the skew coefficient calculation may be:

$$\text{Skew} = (1 - (1/(\text{MaxBucketSize}/\text{AverageBucketSize}))*100$$

One embodiment of a method for generating a skew coefficient for accesses to a database table is illustrated by the flow diagram in FIG. 7. As illustrated at 710, in this example, the method may include a distributed database system storing items in a database table in which each item is stored in a particular partition of the table based on a hash of its primary key value. The method may include the system receiving a request for a skew report for the table, as in 720. For example, the skew report may indicate how close to or far from a uniform distribution the accesses to items having keys in different groupings are (based e.g., on hashes of their primary key values).

As illustrated in FIG. 7, in some embodiments, the method may include dividing the theoretical hash key space into different hash buckets, each representing a range of hash values, as in 730. For example, in one embodiment, a hash key space having $2^{128}$ possible values may be divided equally across 1000 hash buckets. As previously noted, the boundaries of the hash buckets may or may not match the partition boundaries for the table, in different embodiments. For example, having a larger number of buckets than partitions may provide increased granularity (and corresponding visibility into the uniformity of accesses) for the customer/client. The method may also include counting the number of requests for items whose hashed key values fall within each bucket during a given time period, as in 740. For example, this information may be obtained from stored request logs or may be collected as requests are received and processed, in different embodiments.

As illustrated in this example, the method may include determining the maximum number of requests for items whose hashed key values fell within a single bucket during the given time period, as in 750, and determining the average number of requests for items whose hashed key values fell within each bucket during the given time period, as in 760. Using this information, the method may include computing a ratio between the maximum number of requests for items in a single hash bucket and the average number of requests for items each of the hash buckets (e.g., using the formula shown above or another formula, in different embodiments), after which a skew coefficient based on this ratio may be returned to the requestor (as in 770).

Note that in other embodiments, the key space may be divided into buckets representing collections of items (or their keys) differently and/or the distributed database systems may use other metrics to indicate an amount of skew in the distribution of accesses across a given table (e.g., the difference between maximum bucket size and the average bucket size, the slope of line connecting a representation of the bucket sizes in order of increasing size, or other metrics) to indicate a score of the uniformity and/or skew of accesses over a table. For example, in some embodiments, the key space may not be divided into buckets of equal size, or after dividing the key space into buckets of equal size, the key space may be subsequently redistributed among the buckets (e.g., in response to the findings in a skew report). In various embodiments, the number of buckets, the size of the buckets, and/or the specific boundaries of the buckets may be configurable by the system or by clients at different times (e.g., during initialization of the system or an individual table, or when exploring a table, as described herein) in order to provide an appropriate or desired level of visibility into the behavior of the system in response to the pattern of accesses directed to the table.

Note also that, in various embodiments, the skew-related reports returned by the distributed database system may depict a graphical representation of the number (or percentage) of requests per period for each segment of the item or key space, the average number (or percentage) of requests per period for the segments, the maximum number (or percentage) of requests per period (for the most heavily loaded segment), and/or a skew coefficient, such as that described above.

In some embodiments, the time period over which skew-related data and metrics are collected and generated may be configurable (e.g., through an API or GUI). For example, in different embodiments, data usable for generating skew-related metrics may be collected and aggregated for periods of 5 minutes, 1 hour, 1 day, or 1 week, and the period may modified, e.g., to collect information with more or less granularity. For example, in some cases, there may be skew across the key space within a single day (e.g., when a primary key includes data information) but not within a week (e.g., if the accesses are well distributed over a week), or there may be skew across the key space within a 5 minute time period, but not within an hour or a day. Changing the periods during which skew-related metrics are computed may highlight these differences for the customer/client.

In some embodiments, the number of buckets and/or the bucket size may be configurable. In other embodiments, the bucket size may be determined based on a default parameter value, a distribution observed in an initial or previous set of accesses, the number of partitions into which the table is divided, the size of table, the expected or observed traffic directed to the table, a type of imbalance observed, the number or percentage of requests observed to be throttled or admitted, the achieved throughput, or the performance of the database system, in general. In systems in which the bucket size, number of buckets, and/or the specific bucket boundaries can be dynamically adjusted, the customer/client may explicitly pay for more granularity/visibility (e.g., by subdividing some or all of the buckets) in order to drill down in their exploration of the table after observing skew. In some embodiments, the granularity/visibility of the information presented to the customer/client (and therefore the number of buckets) may be dependent on a quality of service level for the customer/client.

In some embodiments, the actual (or active) key space (rather than the theoretical key space) may be divided into hash buckets for the purpose of computing skew-related metrics and reports. In other words, the skew-related metrics and reports may only consider the distribution of accesses across keys that are associated with items currently stored in the database table (or their hash values), rather than across all mathematically possible keys (or their hash values).

In some embodiments, the skew-related reports generated by the distributed database systems described herein may include heat information or other skew-related information for every actual/active or theoretical key, if the key space is relatively small. For example, if the theoretical key space includes on the order of 1000 keys, data may be collected and/or reported on an individual key basis for those 1000 keys, or if the number of active keys is 10,000 out of a theoretical key space of $2^{128}$, data may be collected and/or reported on an individual key basis for those 10,000 keys. In some embodiments, dividing the theoretical or actual/active key space into different buckets may include mapping the keys to respective buckets using the same key ranges (or hashed key ranges) as those used to partition the table. In other embodiments, mapping the keys to respective buckets may include dividing the keys (or hashed key values) in each partition into multiple buckets, e.g. in order of their values. For example, in an embodiment in which the number of buckets is ten times the number of partitions, the first $\frac{1}{10}$ of the values in a given partition may be assigned to a first bucket, the next $\frac{1}{10}$ of the values in the given partition may be assigned to the next bucket, and so on.

As previously noted, the skew-related metrics or reports described herein may in some embodiments be generated in real-time, as requests targeting a particular database table are received and/or serviced. In some such embodiments, information about requests that may be used to generate the skew-related metrics or reports may be collected and/or aggregated on each of the storage nodes of the distributed database system for the requests that target items stored on those storage nodes, and the aggregated skew-related information may be sent to a request router for return or display to the requestor. In other embodiments, information about requests that may be used to generate the skew-related metrics or reports may be collected and/or aggregated on each of one or more request router nodes of the distributed database system for the requests that are routed by those request router nodes to various storage nodes, and the aggregated skew-related information may be returned or displayed to the requestor. In still other embodiments, the skew-related metrics or reports described herein may in some embodiments be delayed. For example, the skew-related metrics or reports may be generated by a post-processing operation in which request logs that were stored on the storage nodes and/or request router nodes are analyzed to generate the skew-related metrics or reports. In one embodiment, to facilitate delayed reported, the storage nodes (such as storage nodes 360 shown in FIG. 3) and/or request router nodes (e.g., one or more front end modules 340 shown in FIG. 3) may storage data locally and/or the front end module(s) may gather information from the storage nodes and push it to external storage (e.g., external storage service 380) for subsequent access and analysis.

More specifically, in some embodiments, skew coefficients (such as those described herein) for a table may be computed locally on each storage node. In one such embodiments, all the request information may be cached locally (e.g., in 1000 integers, one for each of 1000 hash buckets) for each table for one minute (or another configurable time period). At the end of the minute (or other time period), the skew coefficients for read accesses and write accesses for the table may be computed and published.

In other embodiments, skew coefficients (such as those described herein) may be computed in a dedicated aggregator component. In one such embodiment, a count of the requests associated with each bucket may be incremented and cached (e.g., on the request routers) for one minute (or another configurable time period). At the end of the minute (or other time period) this block of information (e.g., the counts for each bucket) may be sent from the request routers to a central aggregator, which may collate all of the received information, compute the skew coefficients for read accesses and write accesses for the table, and publish (or otherwise present) the skew coefficients.

In still other embodiments, information about the primary key for each request may be added to the request logs (e.g., by the request routers), along with an identifier of the hash bucket position for the key. Subsequently, this information may accessed (e.g., in the request logs, which may be stored in backend storage) and post-processed to compute the skew coefficients for read accesses and write accesses for each table.

In some embodiments, access counts for each bucket may be cached (e.g., on the storage nodes and/or request router nodes) until they are aggregated and a skew coefficient has been computed, after which they may be evicted. In some embodiments, in order to use memory more efficiently, skew metrics may only be computed for the tables that are most active. For example, in some embodiments, all of the hash bucket counts may be reset after each period of data collection ends and skew-related metrics are computed and published for all of the hash buckets, while in other embodiments, skew-related metrics may only be computed for hash buckets that experienced activity during the most recent data collection period or that include active hashed keys.

In embodiments in which skew-related information is aggregated on the storage nodes, each table may have multiple partitions, each partition may have multiple replicas (e.g., three), and each storage node may be responsible for one or more of those replicas. In such embodiments, the storage nodes may perform an aggregation of the skew-related information for requests directed to the replicas they store, and may push the skew-related information (e.g., one or more skew coefficients) to a backend data store (e.g., to be made available to and/or to be accessed by a customer/client). For example, the skew-related information may be accessed through a graphical user interface (e.g., a console of the distributed database system or an analysis component of the system) or the published information may be accessed by a client application (e.g., through an API), in different embodiments.

Figure 8:
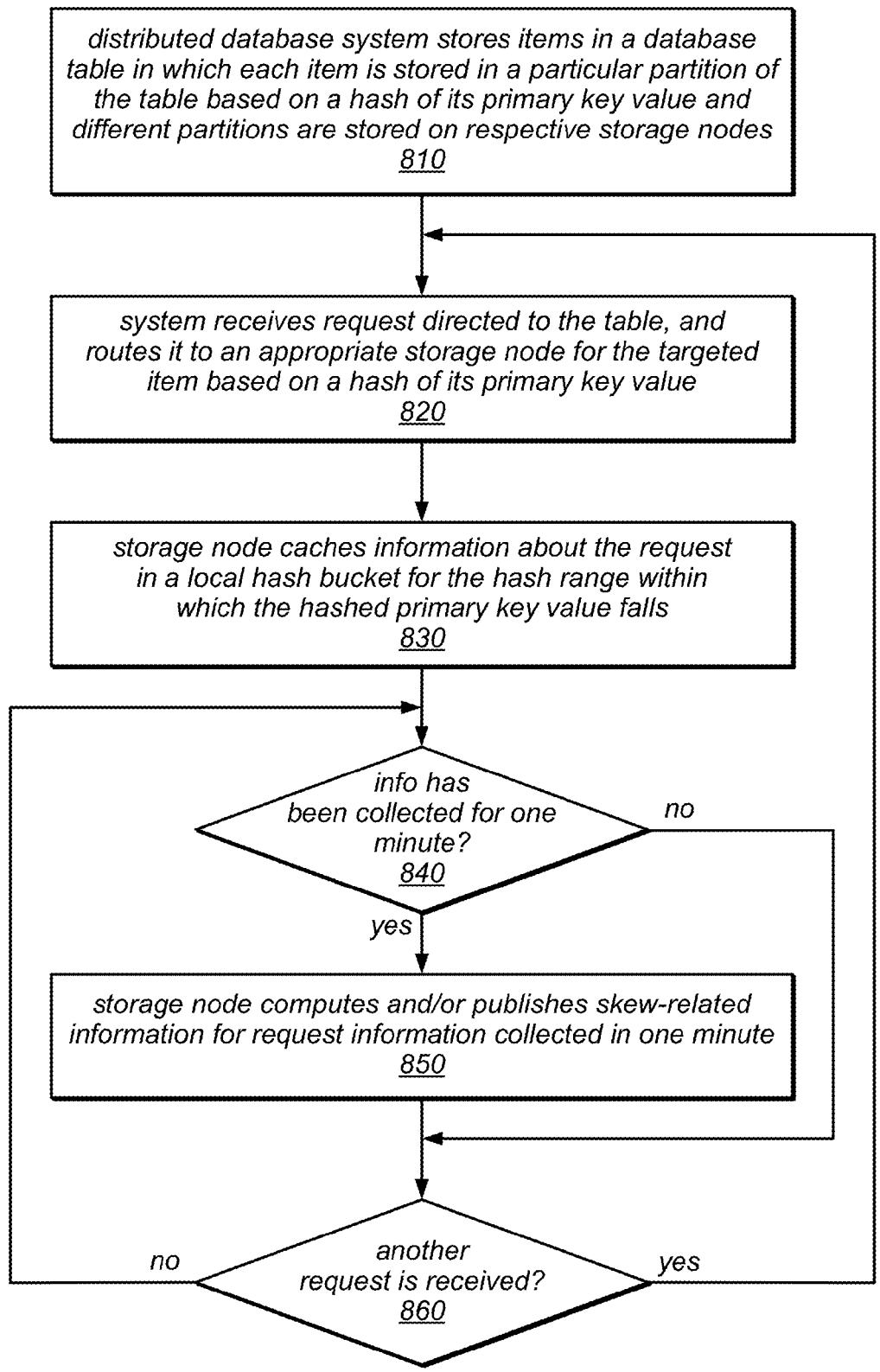
FIG. 8 is a flow diagram illustrating one embodiment of a method for aggregating skew-related information for a database table on one or more storage nodes of a distributed database system.

One embodiment of a method for aggregating skew-related information for a database table on one or more storage nodes of a distributed database system (such as storage nodes 360 in FIG. 3) is illustrated by the flow diagram in FIG. 8. As illustrated at 810, in this example, the method may include a distributed database system storing items in a database table in which each item is stored in a particular partition of the table based on a hash of its primary key value and in which different partitions are stored on respective storage nodes. The method may also include the system receiving a request directed to the table, and routing the request to an appropriate storage node (e.g., a particular storage node 360) for the targeted item based on a hash of its primary key value, as in 820. As illustrated in this example, the storage node may cache information about the request in a local hash bucket for the hash range within which the hashed primary key value falls, as in 830. For example, the theoretical hash space for the database table may be divided into multiple hash buckets (e.g., 1000 hash buckets) and each storage node may cache a count of the accesses to items associated with each of a subset of those buckets (e.g., the hash buckets corresponding to the items it stores). In other words, the storage node may increment a count of the number of requests directed to items stored in its partition(s) for which the hashed key value falls within one of the locally cached hash buckets. As previously noted, information about the requests may be gathered by the storage node when the request is received or when the response to the request is returned, and it may include the primary key value included in the request, an identifier of the partition in which the targeted item is hosted, an indication of whether the request was serviced (admitted) or was rejected (throttled), the time at which the request was received, serviced, and/or routed to the storage node, the size of the response, the amount of provisioned resources that were consumed in satisfying the request, and/or any other information usable in generating various skew-related metrics and reports.

If information about the request (and any other recently received requests) has been collected for a given period of time (i.e., one minute, in this example), the method may include the storage node computing and/or publishing skew-related information based on the request information collected in that time period (e.g., within that one minute). This is illustrated in FIG. 8 by the path from the positive exit from 840 to 850. For example, the storage node may generate and publish skew coefficients for the hash buckets on the node or any other skew-related raw data and/or aggregated skew metrics, in different embodiments. In this example, if data has not yet been collected for an entire minute, the operation illustrated at 850 may be skipped. In the meantime, if another request is received (shown as the positive exit from 860), the method may include repeating the operations shown as 820-850 (as appropriate) for each additional request. This is illustrated in FIG. 8 by the feedback from 860 to 820. Otherwise, once data has been collected for an entire minute, in this example, the method may include the storage node computing and/or publishing skew-related information based on the request information collected in that time period, as in 840. Note that the skew-related information may or may not be aggregated across the storage nodes (e.g., in some embodiments, skew-related information may be presented for each partition/segment and/or may be pushed to a backend data store, and subsequently post-processed to compute table-wide skew coefficients or other table-wide metrics).

As previously noted, in some embodiments, request information may be collected and aggregate on one or more request routers (such as front end module(s) 340 in FIG. 3). These may be the components of the distributed database system that are responsible for request parsing, throttling, and dispatching requests, and caching partition maps. In some such embodiments, when each of these request routers receives a request, it may hash the included primary key value to determine the partition and/or bucket for the item targeted by the request (which may or may not be related or have the same hash key value boundaries). All of the request routers may also count the number of accesses directed to each segment/bucket that corresponds to a portion of the hash value range. Note that the hash value ranges may not map directly to corresponding key space ranges, but may represent a collection of keys and corresponding items. In some embodiments, each request router in a fleet of request routers may be responsible for aggregating data for a particular segment of a given table, and additional request router nodes may be added to the aggregation fleet in order to scale it up, if necessary. Each request router node may store the aggregated information (e.g., one or more skew-related metrics or reports) to a backend data store (e.g., to be made available to and/or to be accessed by a customer/client). For example, the skew-related information may be accessed through a graphical user interface (e.g., a console of the distributed database system or an analysis component of the system) or the published information may be accessed by a client application (e.g., through an API), in different embodiments.

Figure 9:
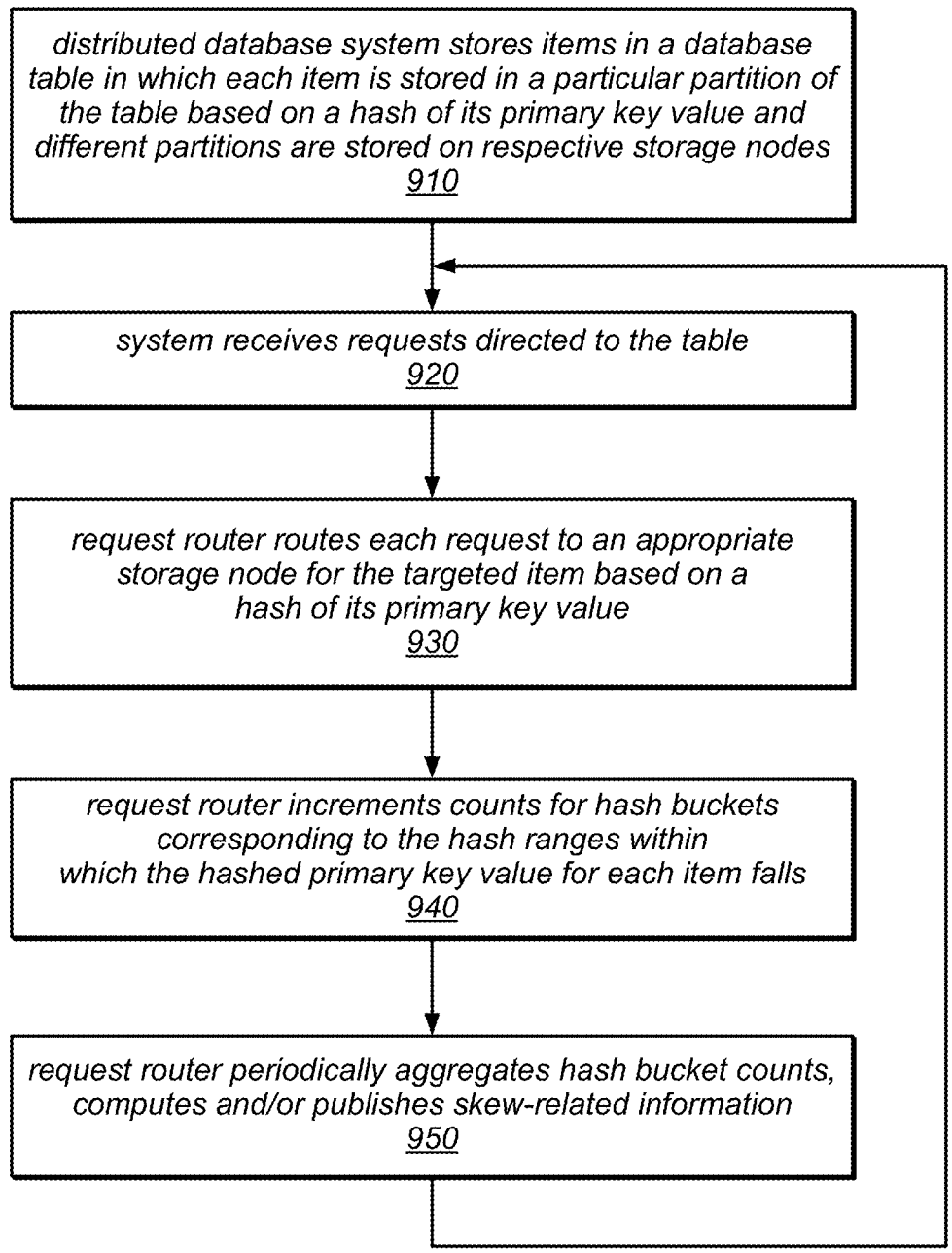
FIG. 9 is a flow diagram illustrating one embodiment of a method for aggregating skew-related information for a database table on one or more request router nodes of a distributed database system.

One embodiment of a method for aggregating skew-related information for a database table on one or more request router nodes of a distributed database system is illustrated by the flow diagram in FIG. 9. As illustrated at 910, in this example, the method may include a distributed database system storing items in a database table in which each item is stored in a particular partition of the table based on a hash of its primary key value and in which different partitions are stored on respective storage nodes. The method may include the system receiving read and/or write requests directed to the table, as in 920, and a request router routing each request to an appropriate storage node for the targeted item based on a hash of its primary key value, as in 930. For example, in some embodiments, front end module(s) 340 may route each request to a particular storage node 360.

As illustrated in this example, for each request, the method may include the request router incrementing a count for a hash bucket corresponding to the hash range within which the hashed primary key value for the item falls, as in 940. Note that in some embodiments, in addition to a request router incrementing a hash bucket request count for each request, the method may also include the request router gathering other information about the request (e.g., when the request is received and/or routed, or when a response to the request is returned). As previously noted, this information may include the primary key value included in the request, an identifier of the partition in which the targeted item is hosted, an indication of whether the request was serviced (admitted) or was rejected (throttled), the time at which the request was received, serviced, and/or routed to one of the storage nodes, the size of the response, the amount of provisioned resources that were consumed in satisfying the request, and/or any other information usable in generating various skew-related metrics and reports.

As illustrated in this example, the method may include the request router periodically aggregating hash bucket counts (and/or other information about the requests), and computing and/or publishing skew-related information, as in 950. For example, the data collection and aggregation period may specified by a configurable parameter value, in some embodiments. Note that, in some embodiments, there may be a fleet of request routers and each of the request routers may perform aggregation operations for a particular partition or segment of one or more tables. Note also that skew-related information may or may not be aggregated across the fleet of request routers (e.g., it may be presented for each partition/segment and/or stored to a backend data store, and subsequently post-processed to compute table-wide skew coefficients or other table-wide metrics) As illustrated in this example, the operations shown as 920-950 may be repeated for each additional request received by the system that is directed to the table. This is illustrated in FIG. 9 by the feedback from 950 to 920.

As previously noted, the boundaries (i.e., hash value ranges) of the partitions of the table are not necessarily the same as the boundaries of the hash buckets. Therefore, in embodiments in which the storage nodes perform aggregation operations, the aggregated information generated by each of the storage nodes may be further aggregated on the request router nodes in order to generate skew-related metrics on a hash-bucket or partition basis (e.g., where there are overlapping ranges between some partitions and buckets). In embodiments in which partitions (or complete sub-partitions) map directly to respective hash buckets, it may be fairly efficient to perform the aggregation operations on the storage nodes.

In various embodiments, in addition to (or instead of) computing and publishing skew coefficients for database tables, as described above, the distributed database systems may compute and present other skew-related metrics and reports. For example, in some embodiments, these systems may publish a distinct key count metric for some or all keys, and/or may report the top "n" keys (e.g., the "n" keys having the most accesses during a given data collection period, where "n" is a configurable parameter). For example, in some cases, the hottest keys may correspond to particular users or products (where the identifiers of users or products serve as the primary keys for the table). Note that a "top-N keys" report may not include an exact count (or any count) of the accesses directed to the corresponding items, but may merely indicate which keys are the accessed the most frequently. In such embodiments, a "top-N keys" report may give the customer an approximate measure of which items are the source of unevenness in the distribution of accesses across a database table. In various embodiments, a "top-N keys" report may identify the hottest "n" keys for the table as a whole, for a given partition, for the keys corresponding to a given hash bucket, or for any other subset of the key space (or hashed key value space). In some embodiments, metrics indicating the minimum, maximum, and/or average number of distinct keys requested in each segment of the theoretical key space (e.g., in each hash bucket) may be computed and published by the distributed database systems described herein. Such metrics may help the customer determine whether or not they have clusters of active or inactive keys within the key space.

In some embodiments, if customers were given reports about which of their items consumed the most resources for a table, they may be able to identify their hotspots, and may use one or more of the techniques described above for caching data or otherwise reducing the traffic directed to those items. For example, if these keys demonstrated an overly excessive request rate (e.g., a request rate that is close to the total capacity of a single partition), the customer may choose a corrective action other than applying the UpdateTable API, which may have diminishing benefit, in this case, or may even make the situation worse.

In some embodiments, the distributed database systems described herein may provide visibility into the resource utilization of each of the partitions (e.g., by providing metrics that inform the customer whether any of their partitions are, or are not, reaching their maximum throughput, i.e., their portion of the total provisioned throughput capacity for the table). For example, the systems may generate a heat map illustrating the amount or percentage of the provisioned throughput capacity (e.g., the "cost" in terms of those resources) that was actually used by each partition (or other collection of items), or another type of graph illustrating the relative utilization of the provisioned throughput capacity (or the provisioned capacity or cost in terms of another type of resource, such as storage capacity, CPU cycles, etc.) by different partitions (or collections of items). In other embodiments, the systems described herein may compute and publish metrics that illustrated aggregate resource utilization by the partitions (or other collections of items), e.g., the average, minimum, and/or maximum percentage utilization across a table's partitions. In such embodiments, if the minimum and maximum utilization percentages are vastly different, the customer may conclude that their workload is not being balanced across their partitions evenly. In still other embodiments, a metric indicating the standard deviation of the key space distribution (e.g., a measure of hose close the distribution is to a normal distribution) may be computed and published by the systems instead of, or in addition to, a skew coefficient (which measures how close the distribution is to a uniform distribution).

In addition to the skew-related metrics and reports described herein, in various embodiments, the distributed database systems described herein may provide customers/clients with various throttling statistics. For example, in various embodiments, these systems may compute and publish one or more of: a count of throttled requests for a given table (for reads and/or writes), a count of successfully serviced requests for the given table, a metric representing the ratio of the number of serviced requests to the number of throttled requests, the minimum, maximum and/or average throughput achieved for a given table during different time periods, the minimum, maximum or average percentage of provisioned capacity used during particular time periods. In some embodiments, similar metrics may be computed and/or published for portion of a given table (e.g., for particular partitions, hash buckets, or other collections of items and/or keys) and/or or may be computed separately for read accesses and for write accesses.

In some embodiments, tables (or portions thereof) may be characterized (e.g., in one or more reports generated by the distributed database systems described herein) using one or more of the following terms:

HOT TABLE: This term may be used to describe a table that is using all of its provisioned throughput capacity and is experiencing a significant amount of request throttling.

HOT KEYRANGE: This term may be used to describe a table that is experiencing an unbalanced load, and in which a specific range of keys dominates the request load.

MOVING HOT POTATO: This term may be used to describe a table that is experiencing a relatively uniform load across all of the key ranges over a long timeframe, but for which the load is highly skewed during shorter timeframes. For example, this may describe a situation in which a user or client application sweeps across all keys, placing a heavy load on each key for a short period of time, until it moves on to the next key.

BURSTY: This term may be used to describe a table that is experiencing a relatively uniform load across the key range, but for which the load is uneven in the time dimension. For example, this may describe a situation in which the table experiences heavy usage during the first five minutes of each hour, followed by fifty-five minutes of inactivity.

GOOD THROTTLING: This term may be used to describe situations in which the total amount of used throughput capacity is close to the total amount of provisioned throughput capacity.

BAD THROTTLING: this term may be used to describe situations in the total amount of used throughput capacity is low, but the amount of throttling is sometimes high.

As previously noted, after being presented with one or more skew-related metrics or reports, a customer/client may further explore a specific table, drilling down in the data to determine a cause of any skew-related issues or to determine an action to take in order to attempt to correct any skew-related issues. For example, in some embodiments, the distributed database systems may support the generation of more granular reports and/or may support the filtering of data in various reports (e.g., by time slices, by hash value ranges, by partitions, etc.) to examine the findings of the reports with more granularity. For example, for a sample of time slices in which throttling is high, a report including the amount of the provisioned throughput capacity that is used per second and the number of admitted and throttled requests may be examined to look for variations in the load due to burstiness in time, a hot range of keys, or a moving hot potato behavior. In another example, given a report that includes the hash keys for a group of requests, the corresponding input/output usage for those requests, and an indication of whether each request was admitted or throttled, data from the report may be extracted and used to generate heat maps for each hash bucket indicating the frequency of requests for various hot keys or partitions, and/or a distribution of requests across the key space. In another example, data in a report that includes request counts per partition, partition sizes, item sizes and the average throughput (e.g., RPS) for various time slices may be used to identify partition outages in those time slices.

FIGS. 10-13 illustrate various examples of skew-related metrics reports that may be generated and presented by the distributed database systems described herein, according to some embodiments. In some embodiments, these types of reports may be generated in real-time as requests are received and serviced, while in other embodiments, they may be generated through post-processes of request logs. As previously noted, in some cases, a customer/client may not care (or may not need to know) which keys, key ranges, or partitions are hot, just whether there is (or is not) a lot of skew in the distribution of accesses across their table.

Figure 10:
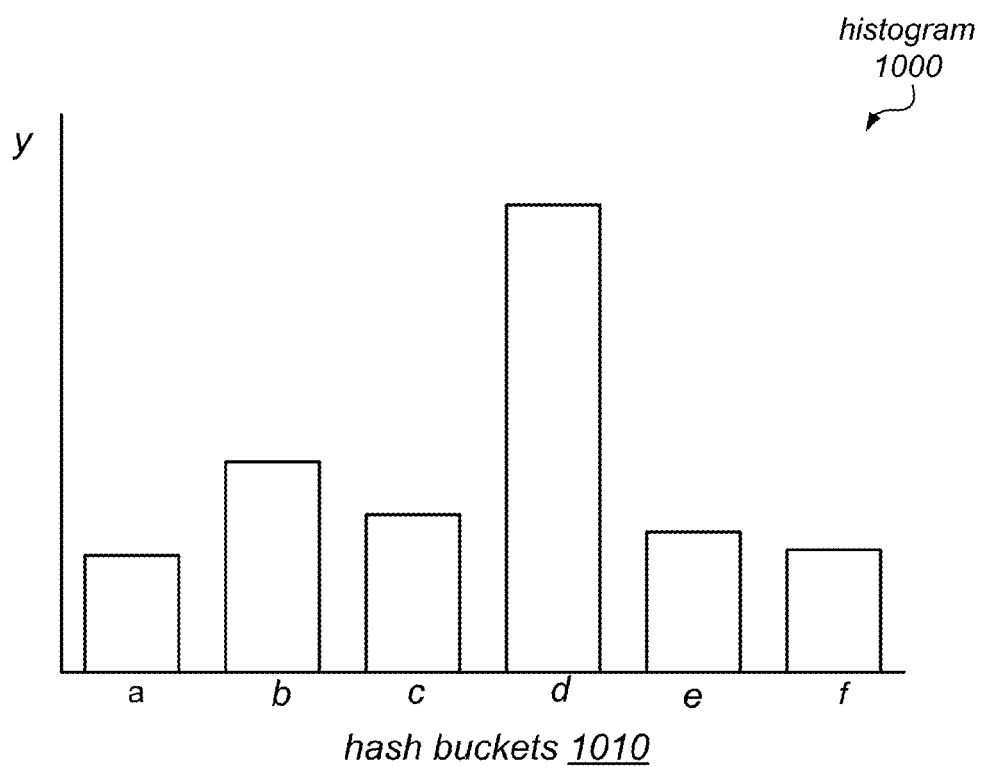
FIG. 10 illustrates a histogram-type graph indicating the amount of uniformity in accesses to items in a distributed database, according to one embodiment.

FIG. 10 illustrates a histogram-type graph that indicates the amount of uniformity in accesses to items in a table in a distributed database during a given time period, according to one embodiment. In this example, the height of each bar (a-f) of histogram 1000 represents the value of skew-related parameter or metric (e.g., a raw data value or an aggregated value) associated with the corresponding hash bucket 1010. For example, different positions along the y axis of histogram 1000 may represent a number or percentage of requests associated with each hash bucket 1010 (from among a collection of requests directed to a database table), the number or percentage of input/output accesses directed to items associated with each hash bucket 1010 during a particular time period, a percentage of provisioned throughput capacity used by a partition or sub-partition corresponding to each hash bucket 1010, or a number or percentage of admitted or throttled requests that are associated with each hash bucket 1010, in different embodiments.

In this example, the bars a-f may be arranged along the x axis of histogram 1000 in order of the identifiers for the corresponding hash buckets. In this example, each hash bucket may correspond to a range of hash key values for items that are accessed by requests directed to the table. In other embodiments, a histogram similar to histogram 1000 may be generated and presented by the system in which each bar of the histogram corresponds to a range of key values or to a partition (or sub-partition) of a table in a distributed database system.

Figure 11:
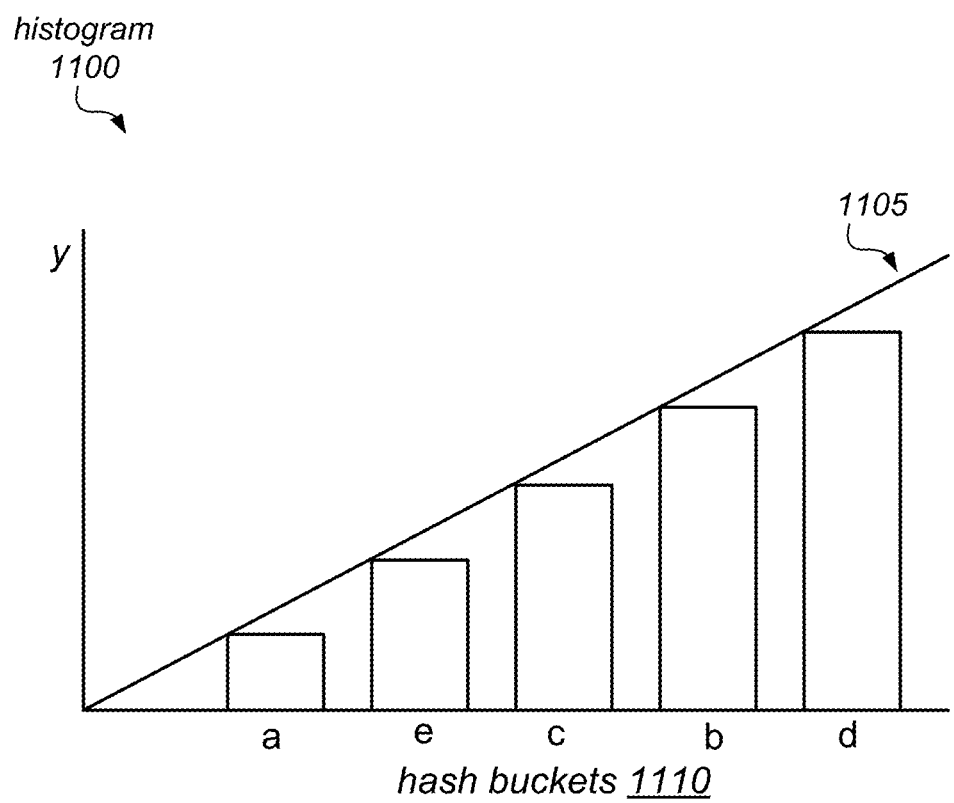
FIG. 11 illustrates a histogram-based graph containing a line whose slope indicates the amount of uniformity in accesses to items in a distributed database, according to one embodiment.

FIG. 11 illustrates a histogram-based graph containing a line whose slope indicates the amount of uniformity in accesses to items in a distributed database, according to one embodiment. As in the previous example, the height of each bar (a-e) of histogram 1100 represents the value of skew-related parameter or metric (e.g., a raw data value or an aggregated value) associated with the corresponding hash bucket 1110. For example, different positions along the y axis of histogram 1100 may represent a number or percentage of requests associated with each hash bucket 1110 (from among a collection of requests directed to a database table), the number or percentage of input/output accesses directed to items associated with each hash bucket 1110 during a particular time period, a percentage of provisioned throughput capacity used by a partition or sub-partition corresponding to each hash bucket 1110, or a number or percentage of admitted or throttled requests that are associated with each hash bucket 1110, in different embodiments.

In this example, the bars a-e may be arranged along the x axis of histogram 1100 in order of their heights, and the slope of the line 1105, which has been fit to the heights of bars a-e may represent the amount of uniformity (or skew) in the accesses to the items corresponding to hash buckets 1110. For example, if line 1105 had a slope of 0, this may indicate a perfectly uniform distribution. However, since the slope of line 1105 is non-zero, the slope may serve as a measure of the amount of skew in the accesses, such that the closer line 1105 is to vertical, the more skewed the distribution of accesses is. In this example, each hash bucket may correspond to a range of hash key values for items that are accessed by requests directed to the table. In other embodiments, a histogram similar to histogram 1100 may be generated and presented by the system in which each bar of the histogram corresponds to a range of key values or to a partition (or sub-partition) of a table in a distributed database system.

Figure 12:
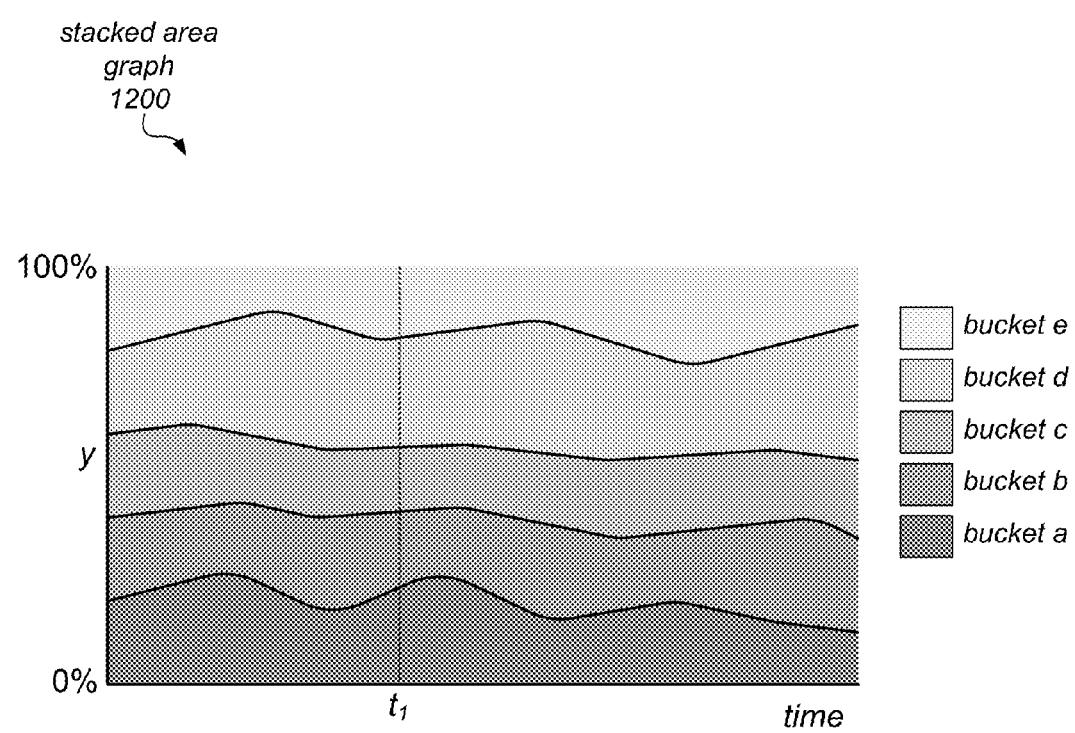
FIG. 12 illustrates a stacked area graph indicating a distribution of accesses to items in a distributed database, according to one embodiment.

FIG. 12 illustrates a stacked area graph indicating a distribution of accesses to items in a distributed database over time, according to one embodiment. In this example, the width of each portion of stacked area graph 1200 having a different color (in the y-dimension) represents the percentage of a skew-related parameter or metric (e.g., a raw data value or an aggregated value) associated with a corresponding hash bucket (a-e) at a particular point in time, such that the sum of those values at any point in time equals 100%. In addition, the areas of each of the differently colored portions of stacked area graph 1200 may represent the relative percentages of that skew-related parameter or metric that are associated with the corresponding hash buckets (a-e) over the entire time period illustrated in FIG. 12.

For example, the difference between the two positions along the y axis of stacked area graph 1200 corresponding to the upper and lower edges of one of the differently colored portions of stacked area graph 1200 may represent a percentage of requests associated with the corresponding hash bucket during a particular period in time, the percentage of input/output accesses directed to items associated with the hash bucket during a particular period in time, a percentage of provisioned throughput capacity used by a partition or sub-partition corresponding to the hash bucket during a particular period in time, or a percentage of admitted or throttled requests that are associated with the hash bucket during a particular period in time, in different embodiments. In this example, the relative widths of the differently colored portions of stacked area graph 1200 at the point in stacked area graph 1200 labeled time $t_1$, may represent the value of the raw or aggregated skew-related metric that was computed (e.g., from data collected during a particular period of time) and/or published at time $t_1$. Note that a histogram similar to one illustrated in FIG. 10 or in FIG. 11 may be generated illustrating the information depicted in FIG. 12 at time $t_1$.

In this example, the differently colored portions of stacked area graph 1200 corresponding to hash buckets a-e are arranged (from bottom to top) in order of the identifiers for the corresponding hash buckets. In other embodiments, the differently colored portions of stacked area graph 1200 corresponding to hash buckets a-e may be arranged (from bottom to top) in order of their widths at a given point in time (e.g., the point in time represented at the far left side of the graph) or by their areas. In this example, each hash bucket may correspond to a range of hash key values for items that are accessed by requests directed to the table. In other embodiments, a stacked area graph similar to stacked area graph 1200 may be generated and presented by the system in which each bar of the histogram corresponds to a range of key values or to a partition (or sub-partition) of a table in a distributed database system.

Figure 13:
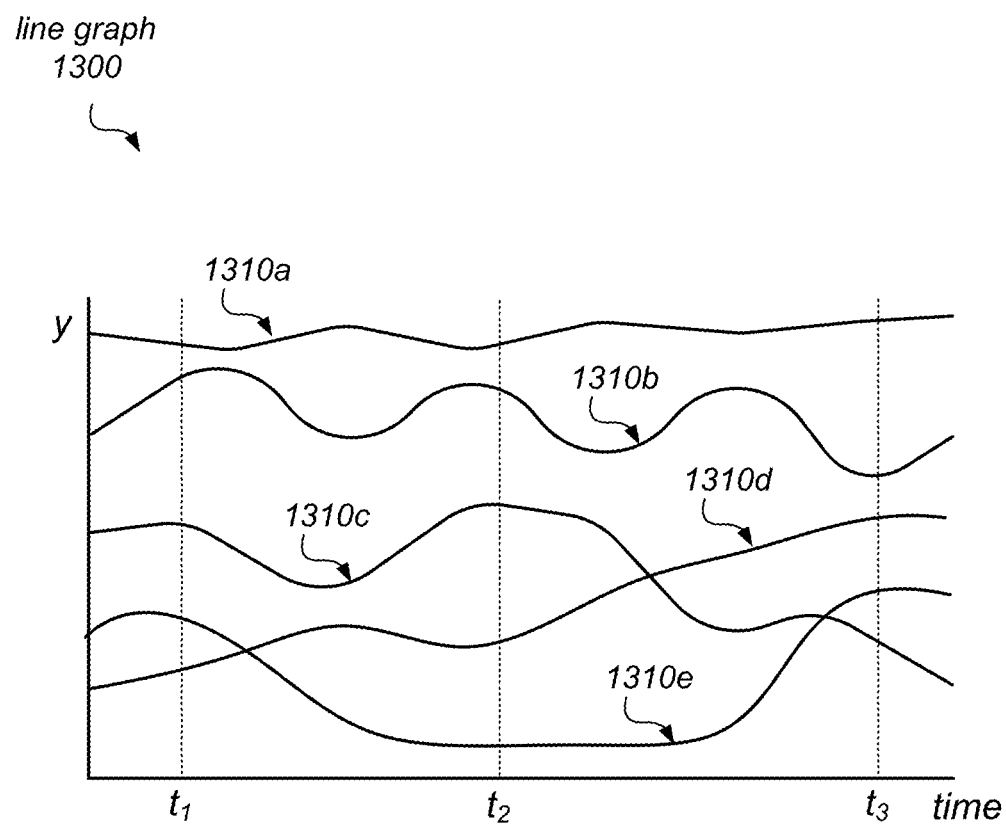
FIG. 13 illustrates a line graph indicating a distribution of accesses to items in a distributed database, according to one embodiment.

FIG. 13 illustrates a line graph indicating a distribution of accesses to items in a distributed database over time, according to one embodiment. In this example, the y value of each line 1310a-1310e in line graph 1300 at a particular point in time may represent the value of skew-related parameter or metric (e.g., a raw data value or an aggregated value) associated with a corresponding hash bucket during a particular time period. For example, different positions along the y axis of line graph 1300 may represent a number or percentage of requests associated with each hash bucket (from among a collection of requests directed to a database table) during a particular time period, the number or percentage of input/output accesses directed to items associated with each hash bucket during a particular time period, a percentage of provisioned throughput capacity used by a partition or sub-partition corresponding to each hash bucket during a particular time period, or a number or percentage of admitted or throttled requests that are associated with each hash bucket during a particular time period, in different embodiments.

In this example, each point on each line 1310 may represent the value of the raw or aggregated skew-related metric that was computed (e.g., from data collected during a particular period of time) and/or published at that point in time (e.g. at time $t_1$, time $t_1$, or time $t_1$. As illustrated by the crossing lines in this example, the relative values of these metrics may change over time. For example, at time $t_1$, line 1310e is above line 1310d, indicating that the value of the metric represented by the y axis was higher for the bucket associated with line 1310e than for the bucket associated with line 1310d, at that point in time. However, at time $t_2$, and again at time $t_3$, the value of the metric represented by the y axis was higher for the bucket associated with line 1310d than for the bucket associated with line 1310e. Similarly, at time $t_1$, line 1310c is above lines 1310d and 1310e, indicating that the value of the metric represented by the y axis was higher for the bucket associated with line 1310c than for the buckets associated with lines 1310d and 1310e, at that point in time. However, at time $t_3$, the value of the metric represented by the y axis was higher for the buckets associated with lines 1310d and 1310e than for the bucket associated with line 1310c. Note that a histogram similar to one illustrated in FIG. 10 or in FIG. 11 may be generated illustrating the information depicted in FIG. 13 at time $t_1$, at time $t_2$, or at time $t_1$.

In some embodiments, the techniques described herein for generating and displaying skew-related metrics and reports may be implemented as a stand-alone tool or as a feature of a tool that is used to manage and/or access tables in a distributed database system. For example, some or all of the functionality described herein may be accessed and/or invoked through a console of the disabused database system or of a client application thereof, or a client or server application may access and/or invoke this functionality programmatically (e.g., through an API), in different embodiments. For example, in some embodiments, the distributed database systems described herein may provide a console in which customers/clients may (after logging in using valid credentials) request the generation and/or display of various skew-related metrics and reports, view various graphs representing skew-related metrics and reports, and/or initiate different functions or actions involving their database tables.

In various embodiments, customers/clients may be able to view graphs illustrating the provisioned throughput capacity, the use of that throughput capacity, request rates, throttling rates, error rates, or any of the skew-related metrics or reports described herein. For example, customers/clients may be able to view graphs similar to those illustrated in FIGS. 10-13 through a console of the disabused database system or of a client application thereof. In some embodiments, in response to selection of a particular type of metrics report, a widget of the user interface may access request logs or other raw or aggregated skew-related information (e.g., from a backend data store for the system) and may generate and/or present the selected report. As previously noted, in addition to presenting requested skew-related metrics and reports, the distributed database system may be configured to present recommendations for corrective action and/or instructions for carrying out those recommendations, in some embodiments. For example, in response to viewing one or more skew-related metrics or reports, a customer/client may attempt to correct an observed skew by invoking (e.g., through the same console in which they viewed the skew-related metrics or reports) an operation to split or move a partition, to add additional read replicas, to request additional throughput capacity, to change an operating parameter of the system (e.g., a hash bucket size or number of buckets, or a time period over which skew-related metrics or reports may be generated), to accept (and/or perform) a recommend corrective action.

Figure 14A:
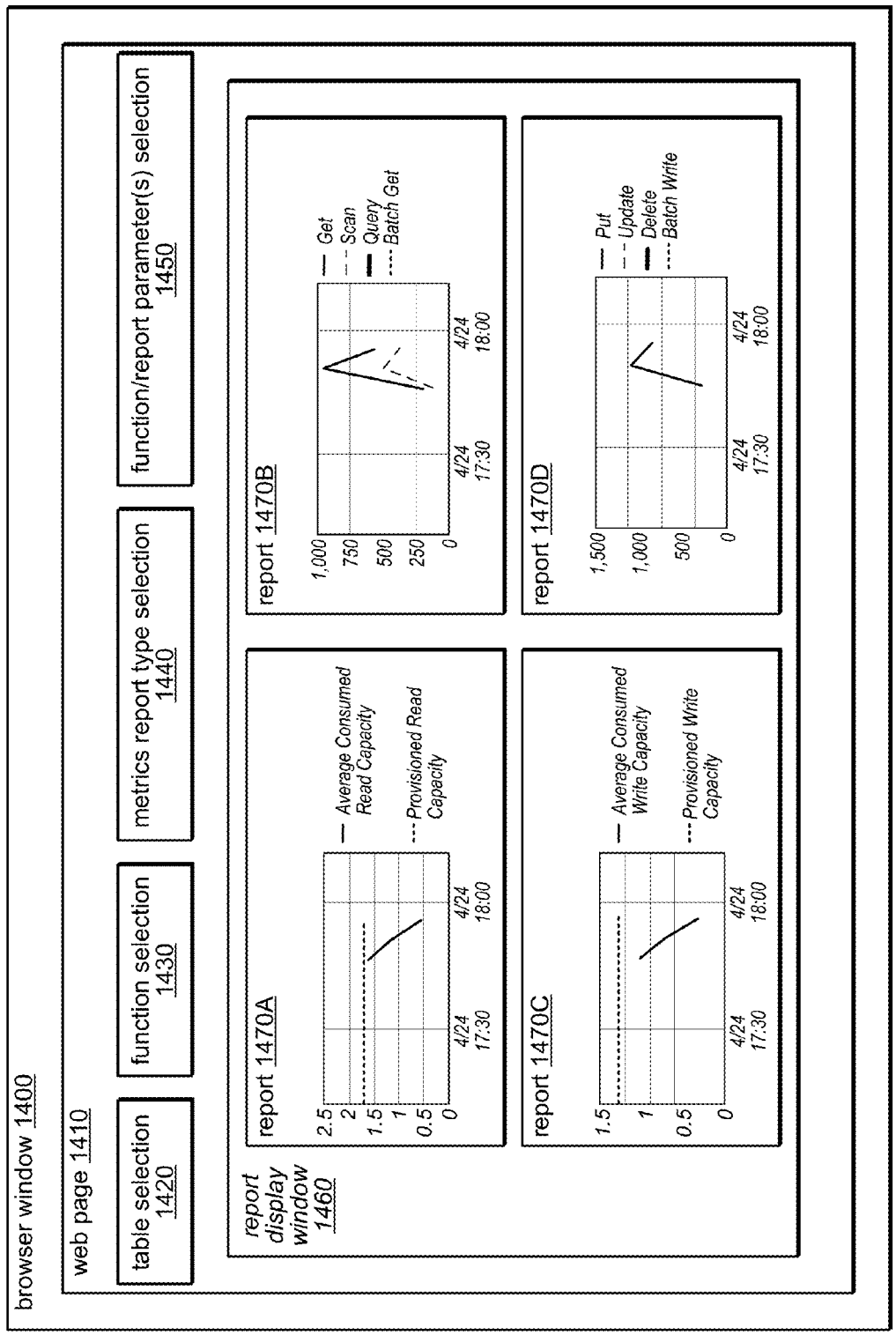
FIGS. 14A and 14B are block diagrams illustrating example graphical user interfaces of a distributed database system, according to some embodiments.
Figure 14B:
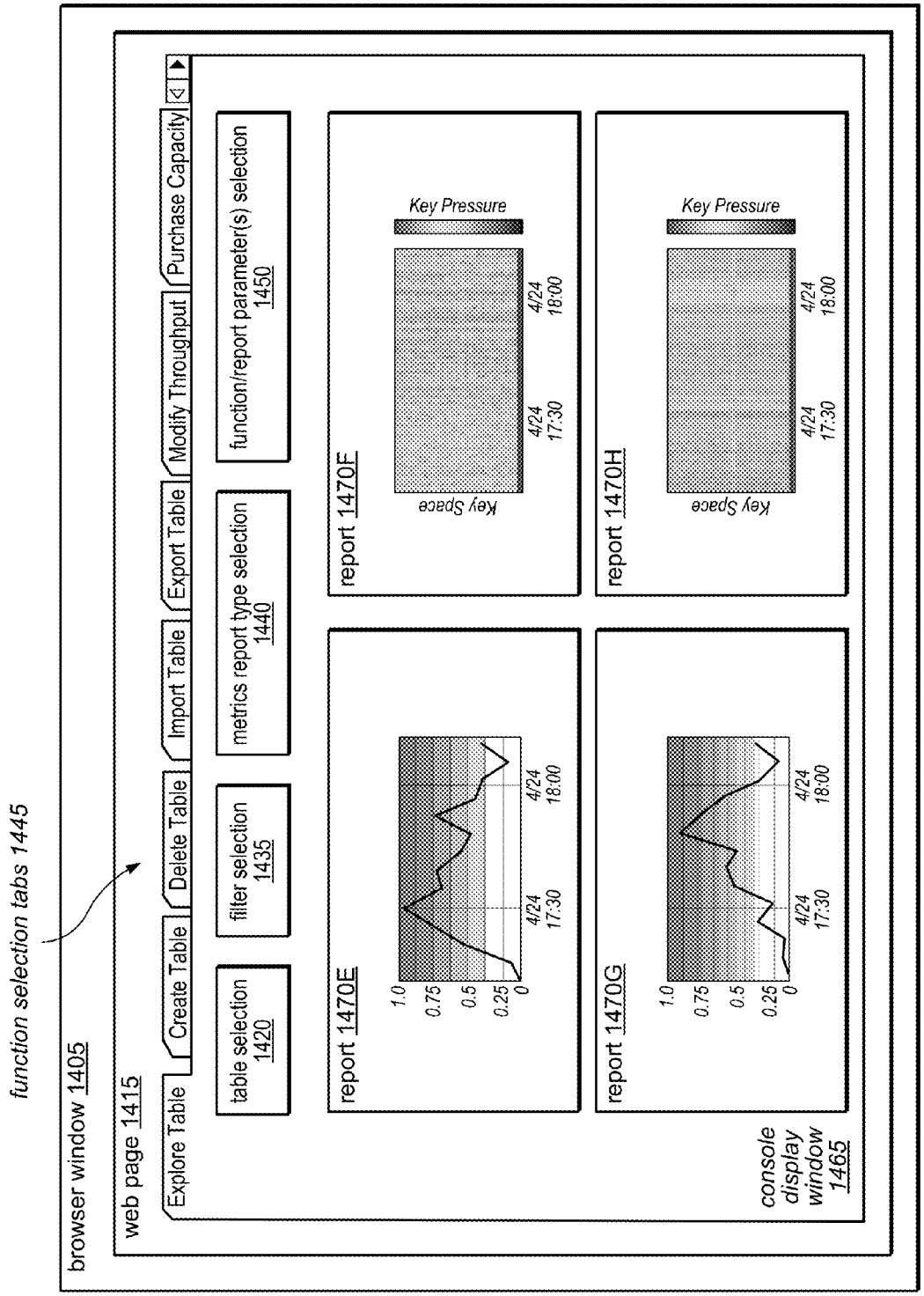

FIGS. 14A and 14B are block diagrams illustrating example graphical user interfaces of a distributed database system, according to some embodiments. As illustrated in FIG. 14A, a GUI of a distributed database system may include a browser window 1400, which may be displayed on an input/output device configured to communicate with the other components of the distributed database system. In this example, browser window 1400 is shown displaying a web page 1410, which may be configured as an interface for invoking various operations on a selected table and/or for requesting and/or viewing skew-related metrics reports, in some embodiments. In this example, web page 1410 includes four input/output fields: a table selection element 1420, a function selection element 1430, a metrics report type selection 1440, a function/report parameter(s) selection element 1450, and a report display window 1460. In various embodiments, table selection element 1420, function selection element 1430, metrics report type selection 1440, and function/report parameter(s) selection element 1450 may be implemented using any combination of pull-down menus, pop-up menus, radio buttons, tabs, text entry boxes, or other types of user interface elements.

In this example, table selection element 1420 may be used to select a table on which to operate (e.g., to manage the table or to generate and display various reports for the table). Function selection element 1430 may be used to invoke an operation on the selected table, such as exploring a table (e.g., by generating and/or view various skew-related metrics or reports), creating a table, deleting a table, importing a table, exporting a table, modifying the amount of throughput capacity for the table, or purchasing additional capacity for the table (e.g., adding additional read replicas). Metrics report type selection field 1440 may in some embodiments be used to specify the report or reports that are to be generated. For example, a user may specify one or more reports to be generated by selecting one or more items on a pull-down menu or radio buttons, in different embodiments. In some embodiments, a customer/client may be able to specify a desire to "view all metrics" or "view selected metrics" through metrics report type selection field 1440.

In one embodiment, each of a set of standard skew-related reports (e.g., those illustrated in FIGS. 10-13) may be selectable by a pull-down menu or other means, or a user may specify that a custom report should be generated. If a custom report is generated, the user may be prompted to enter the parameters of the custom report (e.g., the data fields and corresponding value ranges to extract from the data store) in function/report parameters selection field 1450 or in another custom parameters selection field (not shown), in different embodiments. For example, a customer/client may be able to specify a desired throughput capacity for a table, a number of partitions into which a table should be divided, a hash bucket size or a number of buckets, a time period over which skew-related metrics or reports may be generated, or other parameter values though function/report parameter selection element 1450.

As illustrated in FIG. 14A, requested report(s) may be presented to the customer/client on web page 1410 in report display window 1460. For example, if the user has specified that one or more reports should be displayed, or if this is a default condition for various reports, one or more tabular or graphical reports may be displayed in this window, in some embodiments. In the example illustrated in FIG. 14A, skew-related reports 1470A-1470D are being presented within report display window 1460. For example, report 1470A includes a graph illustrating information about provisioned and used throughput capacity for reads over time, report 1470B includes a graph illustrating information about throttled reads over time, report 1470C includes a graph illustrating information about provisioned and used throughput capacity for writes over time, and report 1470D includes a graph illustrating information about throttled writes over time. In some embodiments, other information about a selected table may be displayed in report display window 1460 when the function "explore table" has been selected, such as an identifier of the table, a table type, the status of the table (e.g. active or inactive) the primary key for the table (e.g., a hash key and/or range key), the committed throughput capacity for the table, the number of partitions into which the table is currently divided, or the size of the table.

FIG. 14B illustrates an example graphical user interface that is similar to that illustrated in FIG. 14A and that includes many of the same elements, except that in FIG. 14B, function selection is performed using the function selection tabs 1445 at the top of the console display window 1465, rather than with another type of user interface element, and console display window 1465 includes a filter selection element 1435 that is not included in report display window 1460 in FIG. 14A. For example, using function selection tabs 1445, a using may invoked a function to "Explore Table", "Create Table", "Delete Table", "Import Table", "Modify Throughput", or "Purchase Capacity. Like FIG. 14A, FIG. 14B includes a browser window (shown as 1405), a web page (shown as 1415), a display window (shown as console display window 1465), a table selection element 1420, a metrics report type selection 1440, and a function/report parameter(s) selection element 1450.

In the example illustrated in FIG. 14B, skew-related reports 1470E-1470H are being presented within console display window 1465. For example, report 1470E includes a graph illustrating information about skew (e.g., including a skew coefficient) over the key space for reads over time, and report 1470F includes a heat map illustrating the distribution of read accesses over the key space over time. In this example, the skew coefficient is represented in report 1470E as a solid line superimposed over a graph of color-coded skew coefficient ranges that indicate increasing criticality as the skew coefficient value rises. Similarly, report 1470G includes a graph illustrating information about skew (e.g., including a skew coefficient) over the key space for writes over time, and report 1470H includes a heat map illustrating the distribution of write accesses over the key space over time. In some embodiments, other information about a selected table may be displayed in console display window 1465 when the function selection tab 1445 labeled "Explore Table" has been selected, such as an identifier of the table, a table type, the status of the table (e.g. active or inactive) the primary key for the table (e.g., a hash key and/or range key), the committed throughput capacity for the table, the number of partitions into which the table is currently divided, or the size of the table.

In some embodiments, heat maps such as those illustrated in reports 1470F and 1470H in FIG. 14B may be three dimensional heat maps in which color is used to depict the third dimension (i.e., the heat of each key at a given point in time), the other two dimensions representing the key space and time. In other embodiments three-dimensional heat maps may be depicted in skew-related reports using isometric graphs in which heat is depicted as the "height" of each two-dimensional element in the graph. In other embodiments, such heat maps may illustrate the relative numbers of read requests that were admitted, write requests that were admitted, read requests that were throttled, write requests that were throttled, or other parameters for accesses over the key space and over time.

Figure 15:
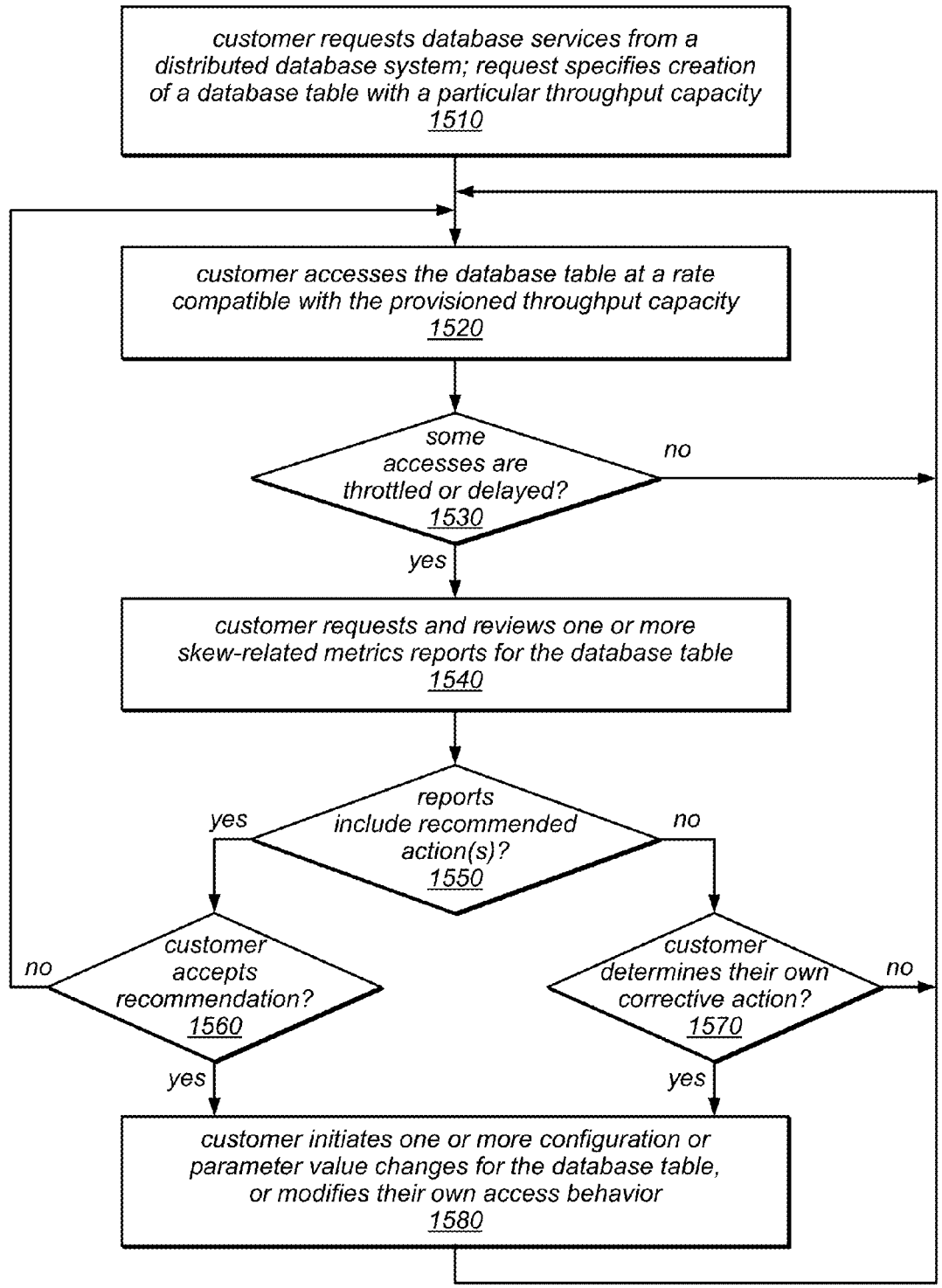
FIG. 15 is a flow diagram illustrating one embodiment of a method for a customer to explore skew-related metrics for a database table.

One embodiment of a method for a customer to explore skew-related metrics for a database table is illustrated by the flow diagram in FIG. 15. As illustrated at 1510, in this example, the method may include a customer requesting database services from a distributed database system, where the request specifies the creation of a database table with a particular throughput capacity. In some embodiments, the request may be received through a GUI, such as the console display window 1465 illustrated in FIG. 14B, or through a console of a separate analysis tool. As illustrated in this example, once the table has been created, the method may include the customer accessing the database table at a rate that is compatible with the (total) provisioned throughput capacity for the table, as in 1520.

If some of the received accesses are throttled (or are admitted, but their processing or responses are delayed), shown as the positive exit from 1530, the method may include the customer requesting and reviewing one or more skew-related metrics reports for the database table, as in 1540. For example, in one embodiment, the customer may explore skew-related aspects of the table through a GUI, such as the console display window 1465 illustrated in FIG. 14B, or through a console of a separate analysis tool. Otherwise, shown as the negative exit from 1530, the method may include the customer continuing to access the database table at a rate that is compatible with provisioned throughput capacity without making any changes to the configuration of or any parameter values for the database table. This is illustrated in FIG. 15 by the path from the negative exit of 1530 to 1520.

In the case that the customer requests and reviews one or more skew-related reports and those reports include one or more recommended actions (shown as the positive exit from 1550), the method may include the customer accepting the recommendation (shown as the positive exit from 1560), after which the customer may initiate one or more configuration and/or parameter value changes for the database table, or may modify their own access patterns/behavior to improve performance and/or make better use of the database table in their application, as in 1580. Note that in this case, the customer may initiate configuration or parameter value changes that are identified as recommended actions and may also initiate one or more additional configuration or parameter value changes. As illustrated in this example, if the customer does not accept the recommendation (shown as the negative exit from 1560), the method may include the customer continuing to access the database table at a rate that is compatible with provisioned throughput capacity without making any changes to the configuration of or any parameter values for the database table, as in 1520.

In this example, if the reports do not include any recommended actions (shown as the negative exit from 1550), but the customer determines their own corrective action to take (e.g., based, at least in part, on the reports), shown as the positive exit from 1570, the method may include the customer initiating one or more configuration and/or parameter value changes for the database table, or modifying their own access patterns/behavior, as in 1580. In various embodiments, the recommend and/or customer-determined changes may include adding more replicas, purchasing more throughput capacity, splitting a partition, moving a partition, changing one or more report parameters in order to dig deeper into skew-related issues uncovered by the reports, or modifying customer access patterns (e.g., in a client application) to encourage or achieve a more uniform distribution of accesses across time and/or the key space of the table. After any changes are made, the method may include the customer continuing to accessing the table (shown as the feedback from 1580 to 1520). In some embodiments, any changes may be initiated through a GUI such as the console display window 1465 illustrated in FIG. 14B, or through a console of a separate analysis tool.

Note that while several examples herein describe the use of various skew reporting techniques to explore the distribution of resource consumption for resources that are explicitly provisioned or reserved for the use of particular database tables and/or their partitions (e.g., as requested or negotiated by the customer), in other embodiments, these techniques may be employed to explore the behavior of a database system in which resource capacity limits are not tied to particular tables or partitions or in which customers do not have any input on the amount of resources they may consume. For example, in some embodiments, the only limits on the amount of resource capacity that can be consumed by a table (or any of its partitions) may be due to the physical limits of the particular computing nodes on which the database system is implemented. In other embodiments, resource consumption limits may be placed on various tables or partitions thereof by the system, based on historical usage patterns, the system architecture or various configurations thereof, or various internal policies or constraints. In these alternate embodiments, the skew reporting techniques described herein may help the customer utilize the database system in an efficient and/or cost-effective manner, e.g., by highlighting customer access patterns that contribute to excessive throttling by the system.

Figure 16:
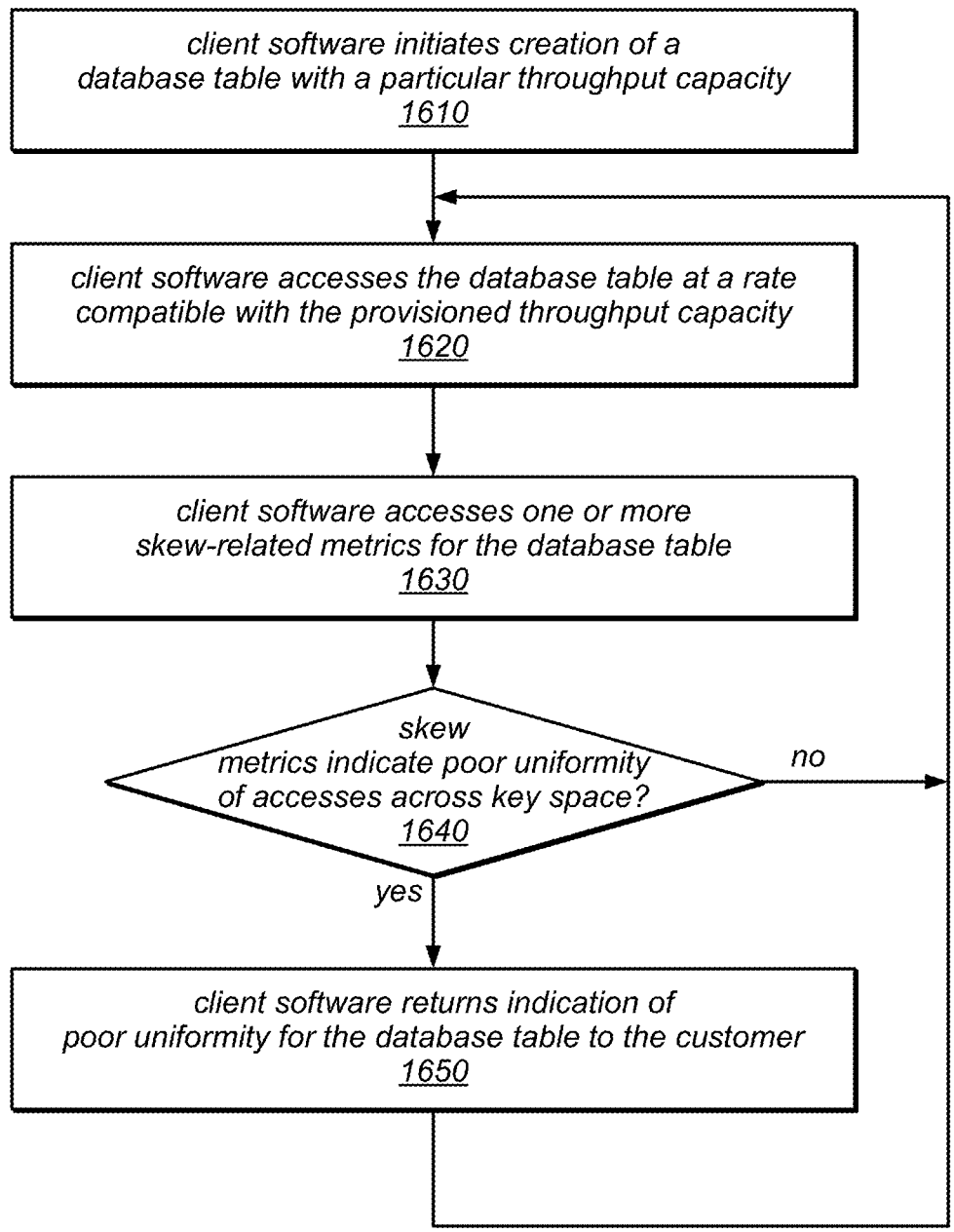
FIG. 16 is a flow diagram illustrating one embodiment of a method for client software to take advantage of skew-related metrics for a database table.

One embodiment of a method for client software to take advantage of skew-related metrics for a database table is illustrated by the flow diagram in FIG. 16. As illustrated at 1610, in this example, the method may include client software initiating the creation of a database table with a particular throughput capacity. For example, the client software may initiate the creation of a table using a "CreateTable" API such as that described herein. As described herein, a desired throughput capacity for the table may be specified in the request to create the table, or the system may determine the throughput capacity for the table, based on various internal policies and/or constraints, in different embodiments. The method may include the client software accessing the database table at a rate that is compatible with the provisioned throughput capacity, as in 1620, e.g., using various operations specified by an API for "putting", "getting" or "updating" various items in the table.

As illustrated in this example, the method may include the client software accessing one or more skew-related metrics (or reports) for the database table, as in 1630. For example, the client software may read the value of a recently computed skew coefficient that was stored in a backend data store in response to detecting throttling or maybe periodically as part of its normal operation. In some embodiments, the distributed database system may be configured to generate skew coefficients once every minute, every five minutes, or every hour, and the client software may be configured to poll the location at which one of the skew coefficients is store with approximately the same frequency.

If the skew metrics (or report) indicate poor uniformity of accesses across the key space for the table, shown as the negative exit from 1640, the method may include the client software returning an indication of poor uniformity for the database table to the customer, as in 1650. For example, if a skew coefficient exceeds a pre-determined skew coefficient threshold value or if the skew coefficient is changing (e.g., getting worse) at rate that exceeds than a pre-determined threshold change rate, the client software may be configured to set an alert or alarm condition (or flag) to indicate that a skew-related issue exists, after which the client software (or the customer) can decide whether or not to drill down into the skew-related data for more information, take corrective action, continue operating without taking any action, continue monitoring various skew-related metrics, or change one or more report parameters (e.g., in order to check skew-related metrics more often or to check more or different metrics), in different embodiments.

It is contemplated that in some embodiments, any of the methods, techniques or components described herein may be implemented as instructions and data capable of being stored or conveyed via a computer-accessible medium. Such methods or techniques may include, for example and without limitation, various methods for providing database services in multi-tenant and single-tenant environments, and for generating and/or using skew-related metrics for a database table maintained a distributed database system, as described herein. Such instructions may be executed to perform specific computational functions tailored to specific purposes (e.g., processing requests received via a Web services interface, or returning feedback and/or results of servicing various requests) as well as higher-order functions such as operating system functionality, virtualization functionality, network communications functionality, application functionality, storage system functionality, and/or any other suitable functions.

Figure 17:
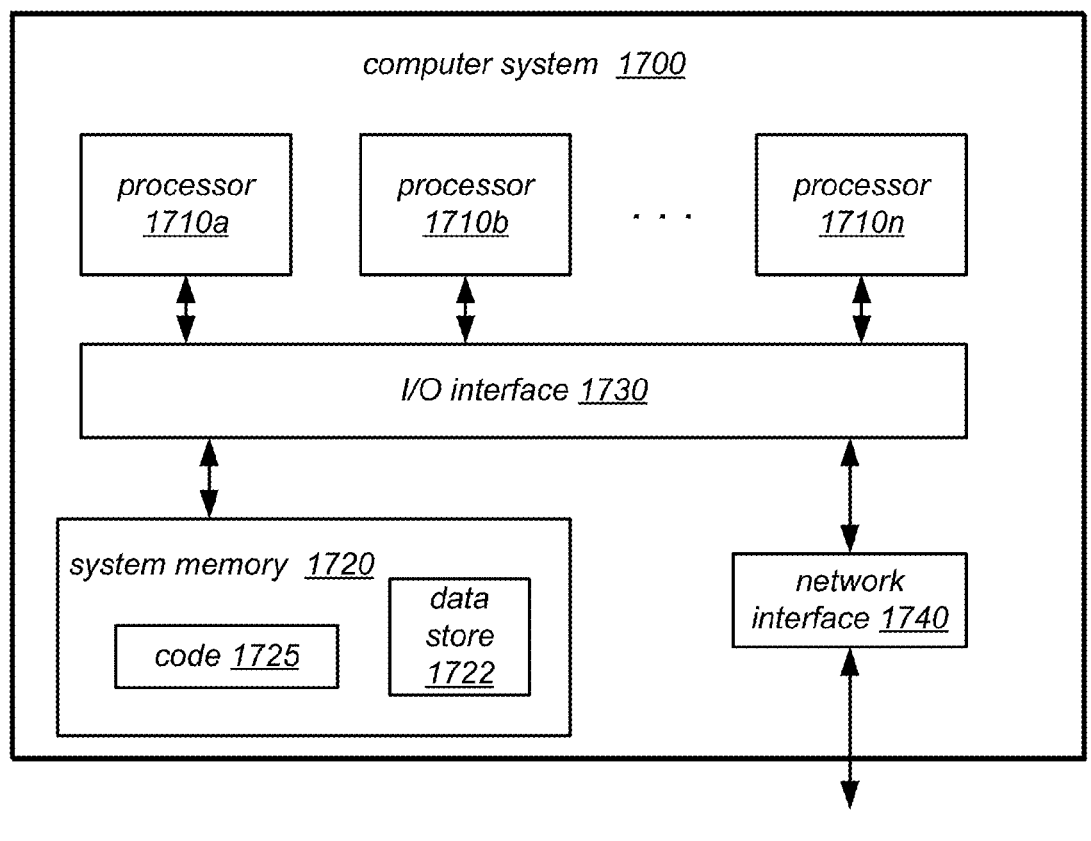
FIG. 17 illustrates one embodiment of a computer system that implements one or more of the techniques described herein for generating and/or using skew-related metrics for a database table maintained a distributed database system.

One embodiment of a computer system that implements one or more of the techniques described herein for generating and/or using skew-related metrics for a database table maintained a distributed database system is illustrated in FIG. 17. In different embodiments, the functionality of any of the various modules or methods described herein may be implemented by one or several instances of computer system 1700. In particular, it is noted that different elements of the system described herein may be implemented by different computer systems 1700. For example, a computer system that supports the functionality described herein for managing service requests may be implemented on the same computer system 1700 on which a client (through which a customer or subscriber may access the system) executes, or on another computer system 1700, in different embodiments. In another example, different subsystems (e.g., a Web service interface, an admission control subsystem, and a service request subsystem; and/or one or more Web servers or other components) may be implemented on or across multiple ones of the computing nodes, and each of the computing nodes may be similar to computer system 1700.

In the illustrated embodiment, computer system 1700 includes one or more processors 1710 coupled to a system memory 1720 via an input/output (I/O) interface 1730. Computer system 1700 further includes a network interface 1740 coupled to I/O interface 1730. In various embodiments, computer system 1700 may be a uniprocessor system including one processor 1710, or a multiprocessor system including several processors 1710 (e.g., two, four, eight, or another suitable number). Processors 1710 may be any suitable processor capable of executing instructions. For example, in various embodiments processors 1710 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 1710 may commonly, but not necessarily, implement the same ISA.

System memory 1720 may be configured to store instructions (e.g., code 1725) and data (e.g., in data store 1722) accessible by processor 1710. In various embodiments, system memory 1720 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques (such as functionality for generating and/or using skew-related metrics for a database table maintained a distributed database system using any or all of the mechanisms described herein), are shown stored within system memory 1720 as code 1725. It is noted that in some embodiments, code 1725 may include instructions and data implementing desired functions that are not directly executable by processor 1710 but are represented or encoded in an abstract form that is translatable to instructions that are directly executable by processor 1710. For example, code 1725 may include instructions specified in an ISA that may be emulated by processor 1710, or by other code 1725 executable on processor 1710. Alternatively, code 1725 may include instructions, procedures or statements implemented in an abstract programming language that may be compiled or interpreted in the course of execution. As non-limiting examples, code 1725 may include code specified in a procedural or object-oriented programming language such as C or C++, a scripting language such as perl, a markup language such as HTML or XML, or any other suitable language.

In some embodiments, data store 1722 within system memory 1720 may store values of default, system-side, client-specific, or type-specific configurable parameters used in generating and/or using skew-related metrics for a database table maintained a distributed database system; observed, sampled, measured, and/or aggregated (e.g., averaged) performance information (including, but not limited to: skew coefficients or other skew-related metrics, skew-related reports, actual work throughput rates, maximum request rates, actual request rates and/or rejection rates, and/or target or committed work throughput rates); configuration data (e.g., hash bucket sizes or numbers of hash buckets, data collection time periods, service level agreement parameter values, admission control policy data, and/or client-specific parameter values); and/or other data in various data structures suitable for implementing the techniques described herein.

In one embodiment, I/O interface 1730 may be configured to coordinate I/O traffic between processor 1710, system memory 1720, and any peripheral devices in the device, including network interface 1740 or other peripheral interfaces. In some embodiments, I/O interface 1730 may perform any necessary protocol, timing or other data transformations to convert data signals from one component (e.g., system memory 1720) into a format suitable for use by another component (e.g., processor 1710). In some embodiments, I/O interface 1730 may include support for devices attached through various types of peripheral buses, such as a variant of the Peripheral Component Interconnect (PCI) bus standard or the Universal Serial Bus (USB) standard, for example. In some embodiments, the function of I/O interface 1730 may be split into two or more separate components, such as a north bridge and a south bridge, for example. Also, in some embodiments some or all of the functionality of I/O interface 1730, such as an interface to system memory 1720, may be incorporated directly into processor 1710.

Network interface 1740 may be configured to allow data to be exchanged between computer system 1700 and other devices attached to a network, such as other computer systems, for example. In various embodiments, network interface 1740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 1720 may include a non-transitory, computer-readable storage medium configured to store instructions and data as described above. However, in other embodiments, instructions and/or data may be received, sent or stored upon different types of computer-accessible storage media. Generally speaking, a non-transitory, computer-readable storage medium may include storage media or memory media such as magnetic or optical media, e.g., disk or CD/DVD-ROM coupled to computer system 1700 via I/O interface 1730. A non-transitory, computer-readable storage medium may also include any volatile or non-volatile storage media such as RAM (e.g. SDRAM, DDR SDRAM, RDRAM, SRAM, etc.), ROM, etc, that may be included in some embodiments of computer system 1700 as system memory 1720 or another type of memory. A computer-accessible storage medium may generally be accessible via transmission media or signals such as electrical, electromagnetic, or digital signals, conveyed via a communication medium such as a network and/or a wireless link, such as may be implemented via network interface 1740.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A system, comprising:
   one or more processors;
   a memory coupled to the one or more processors; and
   a plurality of storage nodes;
   wherein the memory stores program instructions that when executed by the one or more processors cause the one or more processors to implement a distributed database service; and
   wherein the distributed database service is configured to:
   receive a request from a client to create a table having a pre-defined amount of throughput capacity for receiving and servicing requests to perform database operations that target the table;
   create the requested table, wherein each item in the table is accessed using a hash of a respective primary key value for the item, and wherein in creating the table the distributed database service is configured to:

divide the table into two or more partitions, wherein each of the two or more partitions is stored on a respective one of the plurality of storage nodes, wherein each item in the table is stored in a particular one of the two or more partitions based, at least in part, on the hash of the respective primary key value for the item; and provision a portion of the pre-defined amount of throughput capacity on each of the plurality of storage nodes on which one of the two or more partitions are stored;

receive and service a plurality of requests to perform the database operations that access items in the table, wherein each of the plurality of requests includes a respective primary key value; and send to the client a representation of a skew metric based on accesses to the table during servicing of the plurality of requests, wherein the skew metric indicates an amount of deviation from a uniform distribution of the accesses to the table across the primary key hash space for hashes of the respective primary key values included in the plurality of requests to access the items in the table.

2. The system of claim 1, wherein prior to presenting the representation of the skew metric, the distributed database service is configured to:

divide the primary key hash space into a plurality of hash buckets, each comprising a contiguous range of primary key hash values; and determine a number of the plurality of requests that include a respective primary key value whose hash value is within the contiguous range of primary key hash values in each of the hash buckets.

3. The system of claim 2, wherein prior to presenting the representation of the skew metric, the distributed database service is further configured to generate a skew coefficient for the table, wherein to generate the skew coefficient, the distributed database service is configured to compute a ratio between a maximum number of requests that include the respective primary key value whose hash value is within the contiguous range of primary key hash values in any of the hash buckets and an average number of requests that include the respective primary key value whose hash value is within the contiguous range of primary key hash values in each of the hash buckets; and wherein to present the representation of the skew metric, the distributed database service is configured to present a representation of the skew coefficient.

4. The system of claim 2, wherein to present the representation of the skew metric, the distributed database service is configured to present a graphical representation of relative numbers of the plurality of requests that include a respective primary key value whose hash value is within the contiguous range of primary key hash values in each of the hash buckets.

5. The system of claim 1, wherein the distributed databases service comprises a graphical user interface;

wherein presenting the representation of the skew metric is performed in response to receiving a request from the client for the representation of the skew metric through the graphical user interface; and wherein to present the representation of the skew metric, the distributed database service is configured to present the representation of the skew metric to the client through the graphical user interface.

6. A method, comprising:
performing by one or more computers:

creating a table in a distributed database system;

receiving and servicing a plurality of requests to access items in the table, wherein servicing the plurality of requests comprises collecting information about the distribution of the requests over multiple subsets of the items in the table; and based at least in part on the information, generating an indication of a deviation from uniformity exhibited by the distribution of the requests over at least some of the subsets of the items in the table, the indication generated based, at least in part, on a ratio between a number of accesses to a most accessed subset of the items in the table and a number of accesses to an average subset of the items in the table.

7. The method of claim 6, wherein said creating comprises:

provisioning a pre-determined amount of resource capacity for the table, wherein the provisioned resource capacity is distributed across multiple nodes of the distributed database system; and dividing the table into two or more partitions; and wherein said provisioning comprises provisioning a subset of the pre-determined amount of resource capacity for the table for each of the two or more partitions.

8. The method of claim 7, wherein each of the multiple subsets of the items in the table comprises items stored in a particular one of the two or more partitions, or items stored in a particular sub-partition of one of the two or more partitions.

9. The method of claim 6, wherein said collecting comprises collecting information about the distribution of the requests during a particular time period having a pre-determined length.

10. The method of claim 6, wherein each item in the table is associated with a respective primary key value; and wherein each of the multiple subsets of the items in the table comprises items for which a hash of their respective primary key values falls within a particular range of primary key hash values.

11. The method of claim 10, wherein each of the plurality of requests comprises a respective primary key value whose hash value identifies a particular item in the table; and wherein said generating the indication comprises, for each request, incrementing a count of a number of requests for which the hash value of its respective primary key value falls within each of the ranges of primary key hash values.

12. The method of claim 10, wherein each of the plurality of requests comprises a respective primary key value whose hash value identifies a particular item in the table; and wherein said generating the indication comprises determining a portion of a provisioned resource capacity that is consumed by the requests for which the hash value of their respective primary key values fall within each of the ranges of primary key hash values.

13. The method of claim 6, wherein said collecting comprises aggregating the information about the distribution of the requests on each of one or more storage nodes in the distributed database system, wherein each of the one or more storage nodes stores one or more of the multiple subsets of items in the table.

14. The method of claim 6, wherein said collecting comprises aggregating the information about the distribution of the requests on each of one or more request router nodes in the distributed database system, each of which routes at least some of the plurality of requests to particular ones of a plurality of storage nodes in the distributed database system.

15. The method of claim 6, further comprising presenting a representation of the indication of the deviation from uniformity of the distribution of the requests over at least some of the subsets of the items in the table in a graphical user interface.

16. The method of claim 15, wherein the representation comprises, for at least some of the subsets of the items in the table, one or more of: a numerical skew coefficient, a histogram, a stacked area graph, a line graph, or a heat map.

17. A non-transitory, computer-readable storage medium storing program instructions that when executed on one or more computers cause the one or more computers to perform:
   maintaining a plurality of items in a database table in a distributed database system;
   receiving and servicing a plurality of requests to access the items maintained in the database table;
   receiving a request for skew information for the database table, wherein the skew information indicates a measure of deviation from uniformity of accesses to the database table by the plurality of requests across the database table; and
   in response to said receiving the request, returning the skew information.

18. The non-transitory, computer-readable storage medium of claim 17, wherein said receiving the request for the skew information for the database table comprises receiving a request message defined by an application programming interface.

19. The non-transitory, computer-readable storage medium of claim 17, wherein said returning the skew information comprises:
   accessing previously collected information about the items targeted by the plurality of requests, wherein the previously collected information comprises a count of accesses to items in each of a plurality of subsets of the items maintained in the database table;
   generating one or more skew-related metrics based, at least in part, on the previously collected information; and
   returning the one or more skew-related metrics.

20. The non-transitory, computer-readable storage medium of claim 19,
   wherein maintaining the plurality of items in the database table comprises maintaining the plurality of items in two or more partitions;
   wherein the one of the two or more partitions in which each item is maintained in the database table is dependent on a hash of a respective primary key value for the item; and
   wherein each of the plurality of subsets of the items maintained in the database table comprises items for which the hashes of their respective primary key values falls within a pre-determined range of primary key hash values.

21. The non-transitory, computer-readable storage medium of claim 19, wherein one or more of a number of the subsets, a size of the subsets, or a boundary of the subsets is configurable.

* * * * *